US012057132B2

(12) United States Patent
Zhang

(10) Patent No.: US 12,057,132 B2
(45) Date of Patent: Aug. 6, 2024

(54) METHOD, APPARATUS, AND DEVICE FOR TRANSIENT NOISE DETECTION

(71) Applicant: Tencent Music Entertainment Technology (Shenzhen) Co., Ltd., Guangdong (CN)

(72) Inventor: Chaopeng Zhang, Guangdong (CN)

(73) Assignee: Tencent Music Entertainment Technology (Shenzhen) Co., Ltd., Guangdong (CN)

( * ) Notice: Subject to any disclaimer, the term of this patent is extended or adjusted under 35 U.S.C. 154(b) by 152 days.

(21) Appl. No.: 17/728,405

(22) Filed: Apr. 25, 2022

(65) Prior Publication Data

US 2022/0284909 A1 Sep. 8, 2022

Related U.S. Application Data

(63) Continuation of application No. PCT/CN2020/128372, filed on Nov. 12, 2020.

(30) Foreign Application Priority Data

Nov. 13, 2019 (CN) ........................ 201911107575.2

(51) Int. Cl.
*G10L 19/025* (2013.01)
*G10L 19/02* (2013.01)
(Continued)

(52) U.S. Cl.
CPC ........ *G10L 19/025* (2013.01); *G10L 19/0216* (2013.01); *G10L 25/18* (2013.01); *G10L 25/21* (2013.01)

(58) Field of Classification Search
CPC ... G10L 25/21; G10L 21/0216; G10L 19/025; G10L 19/0216; G10L 25/18; G10L 25/03; G10L 25/51
(Continued)

(56) References Cited

U.S. PATENT DOCUMENTS

2008/0183466 A1 7/2008 Nongpiur et al.
2015/0348561 A1* 12/2015 Kovesi .................. G10L 19/012 704/226

(Continued)

FOREIGN PATENT DOCUMENTS

CN 103117066 A 5/2013
CN 104157295 A 11/2014

(Continued)

OTHER PUBLICATIONS

CNIPA, International Search Report for International Patent Application No. PCT/CN2020/128372, 5 pages, Feb. 18, 2021.

(Continued)

*Primary Examiner* — Yogeshkumar Patel
(74) *Attorney, Agent, or Firm* — IP Spring

(57) ABSTRACT

Disclosed is a method, an apparatus, and a device for transient noise detection. The method includes: obtaining an audio frame signal having a preset duration; performing wavelet decomposition on a first audio frame signal to obtain a first wavelet decomposition signal corresponding to the first audio frame signal; determining a first reference audio intensity value of a first sub-wavelet decomposition signal according to reference audio intensity values of all samples in the first sub-wavelet decomposition signal; determining energy distribution information of the first wavelet decomposition signal according to first reference audio intensity values of all sub-wavelet decomposition signals in the first wavelet decomposition signal; and determining a probability that the first audio frame signal is transient noise according to the energy distribution information of the first wavelet decomposition signal.

20 Claims, 14 Drawing Sheets

(51) Int. Cl.
*G10L 25/18* (2013.01)
*G10L 25/21* (2013.01)

(58) Field of Classification Search
USPC .......................................................... 700/94
See application file for complete search history.

(56) References Cited

U.S. PATENT DOCUMENTS

| | | | |
|---|---|---|---|
| 2016/0343385 | A1 | 11/2016 | Hetherington et al. |
| 2017/0133040 | A1* | 5/2017 | Xiao ....................... G10L 25/60 |
| 2017/0206908 | A1* | 7/2017 | Nesta .................... G10L 19/025 |
| 2017/0345433 | A1* | 11/2017 | Dittmar ................... G10L 19/03 |
| 2018/0012614 | A1* | 1/2018 | Soleymani .......... G10L 19/0216 |
| 2019/0287220 | A1* | 9/2019 | Srivastava ............ G06F 17/148 |

FOREIGN PATENT DOCUMENTS

| | | | | |
|---|---|---|---|---|
| CN | 104599677 | A | 5/2015 | |
| CN | 105190751 | A | 12/2015 | |
| CN | 105900171 | A | 8/2016 | |
| CN | 110838299 | A | 2/2020 | |
| EP | 1385150 | A1 | 1/2004 | |
| EP | 2779160 | A1 | 9/2014 | |
| WO | WO-2013067714 | A1 * | 5/2013 | ......... G10L 21/0208 |

OTHER PUBLICATIONS

CNIPA, First Office Action for Chinese Patent Application No. 201911107575.2, 11 pages, Nov. 1, 2021.
CNIPA, Written Opinion for International Patent Application No. PCT/CN2020/128372, 6 pages, Feb. 18, 2021.

* cited by examiner

METHOD, APPARATUS, AND DEVICE FOR TRANSIENT NOISE DETECTION

CROSS-REFERENCE TO RELATED APPLICATION(S)

This application is a continuation under 35 U.S.C. § 120 of PCT/CN2020/128372, filed Nov. 12, 2020, which claims priority under 35 U.S.C. § 119(a) and/or PCT Article 8 to Chinese Application Serial No. 201911107575.2, filed Nov. 13, 2019, the entire disclosures of which are hereby incorporated by reference.

TECHNICAL FIELD

This disclosure relates to the field of audio technology, and particularly relates to a method, apparatus, and device for transient noise detection.

BACKGROUND

Audio is a means of human-computer interaction, and noise interference exists in the working environment all the time. These noises will affect the application effect of audio, so it is necessary to detect the noise for further processing.

In the prior art, transient noise detection mainly analyzes the energy of the signal in a period of time according to the characteristics of the sharp increase of short-term energy of transient noise. If there is a sharp change in the signal energy, the signal in this period of time is detected as transient noise. However, the beginning of the audio signal, that is, the position point where the speech occurs, also has the similar characteristics of sudden energy change in a certain period of time. The accuracy of the scheme in the prior art is not high enough.

SUMMARY

In a first aspect, a method for transient noise detection is provided. The method includes: obtaining a first audio frame signal having a preset duration, the audio frame signal includes a plurality of samples and an audio intensity value of each sample; performing wavelet decomposition on the first audio frame signal to obtain a first wavelet decomposition signal corresponding to the first audio frame signal, the first wavelet decomposition signal includes a plurality of sub-wavelet decomposition signals, and each sub-wavelet decomposition signal includes a plurality of samples and an audio intensity value of each sample; determining a first reference audio intensity value of a first sub-wavelet decomposition signal according to reference audio intensity values of all samples in the first sub-wavelet decomposition signal; determining energy distribution information of the first wavelet decomposition signal according to first reference audio intensity values of all sub-wavelet decomposition signals in the first wavelet decomposition signal; and determining a probability that the first audio frame signal is transient noise according to the energy distribution information of the first wavelet decomposition signal.

In one implementation, obtaining the first audio frame signals having the preset duration includes: obtaining a first audio signal, the first audio signal includes at least one audio frame signal, the at least one audio frame signal includes the first audio frame signal; for each audio frame signal, performing wavelet decomposition to obtain a plurality of wavelet decomposition signals corresponding to each audio frame signal; obtaining a wavelet signal sequence by splicing the wavelet decomposition signals corresponding to each audio frame signal according to a framing order of the at least one audio frame signal in the first audio signal.

The method further includes: obtaining a first minimum audio intensity value of a first preset number of consecutive samples in the wavelet signal sequence and a second minimum audio intensity value of a second present number of consecutive samples in the wavelet signal sequence, where the first preset number of consecutive samples includes a target sample and is before the target sample in the wavelet signal sequence, the second preset number of consecutive samples includes the target sample and is after the target sample in the wavelet signal sequence, and determining a second reference audio intensity value according to the first minimum audio intensity value and the second minimum audio intensity value; determining an average reference audio intensity value of the first audio frame signal according to second reference audio intensity values of all samples in the first wavelet decomposition signal; determining a first probability according to the average reference audio intensity value of the first audio frame signal.

Determining the probability that the first audio frame signal is transient noise according to the energy distribution information of the first wavelet decomposition signal includes: obtaining a second probability according to the energy distribution information of the first wavelet decomposition signal; and determining the probability that the first audio frame signal is transient noise according to the first probability and the second probability.

In one possible implementation, obtaining the first audio frame signals having the preset duration includes: obtaining a first audio signal, the first audio signal includes at least one audio frame signal, and at least one audio frame signal includes the first audio frame signal.

The method further includes: dividing the first audio signal to a plurality of processing signals, where each processing signal includes a third preset number of consecutive samples, an audio intensity value of each sample, and a frequency value of each sample, where the first audio signal includes a plurality of audio frame signals; determining a first smooth audio intensity value of a target sample according to an audio intensity value of a sample, the sample is in a previous processing signal of a first processing signal where the target sample is located and has a frequency value same as the target sample, and an audio intensity value of the target sample; determining an inhibition coefficient of the target sample according to a probability that an audio frame signal where the target sample is located is transient noise, the first smooth audio intensity value of the target sample, and the audio intensity value of the target sample; and performing suppression on an audio intensity value of each sample in an audio frame signal where the target sample is located to obtain a suppressed audio frame signal, according to inhibition coefficients of all samples in the audio frame signal where the target sample is located.

In one possible implementation, the method further includes: obtaining a probability that the first audio frame signal is transient noise and a probability that the second audio frame signal is transient noise, where the second audio frame signal is a previous audio frame signal of the first audio frame signal; and obtaining a first smoothing probability according to the probability that the first audio frame signal is the transient noise and the probability that the second audio frame signal is transient noise and using the first smoothing probability as the probability that the first audio frame signal is transient noise.

In one possible implementation, determining the average reference audio intensity value of the first audio frame signal according to the second reference audio intensity values of all samples in the wavelet decomposition signal includes: dividing the wavelet signal sequence to a plurality of signals to-be-smoothed, where each signal to-be-smoothed includes a fourth preset number of consecutive samples and an audio intensity value of each sample, each signal to-be-smoothed corresponds to a smoothing function, a time width of a definition domain of the smoothing function is not greater than a time width of the signal to-be-smoothed, a maximum value of a first smoothing function in the smoothing functions is located at a center of a definition domain of the first smoothing function; determining an average of audio intensity values of all samples in the first signal to-be-smoothed as a first average reference audio intensity value of all samples in the first smoothing signal; and performing convolution operation on the first average reference audio intensity value of all samples in each signal to-be-smoothed in the wavelet signal sequence and a corresponding smoothing function value to obtain a convolutional result, and using the convolutional result as an average reference audio intensity value of the first audio frame signal, where the smoothing function value is obtained according to the smoothing function and a time of a corresponding sample.

Optionally, before obtaining the first minimum audio intensity value of the first preset number of consecutive samples in the wavelet signal sequence, where the first preset number of consecutive samples includes the target sample and is before the target sample in the wavelet signal sequence, the method further includes: obtaining a third reference audio intensity of the target sample by multiplying an audio intensity value of a previous sample of the target sample in the wavelet signal sequence with a smoothing coefficient; obtaining a fourth reference audio intensity value of the target sample by multiplying a remaining smoothing coefficient with an average of audio intensity values of all consecutive samples in the wavelet signal sequence which includes the target sample and are spliced prior to the target sample in the wavelet signal sequence; and obtaining the audio intensity value of the target sample by adding the third reference audio intensity value with the fourth reference audio intensity value.

In one possible implementation, the reference audio intensity value includes an average and a variance of audio intensity values of a fifth preset number of consecutive samples.

In one possible implementation, the probability that the first audio frame signal is transient noise is expressed as $$res(n) = \left[\frac{1}{2}\left(\cos\left(\text{result}(n) \times \frac{\pi}{\lambda} + \pi\right) + 1\right)\right]^2,$$

where result(n) represents energy distribution information of a wavelet decomposition signal corresponding to the $n^{th}$ audio frame signal, n represents an frame index indicating the $n^{th}$ audio frame signal, $\lambda$ represents a first preset threshold, if a value of result(n) is greater than the first preset threshold, the probability that the first audio frame signal is transient noise is 1.

In one possible implementation, the energy distribution information of the first wavelet decomposition signal corresponding to the first audio frame signal is expressed as $$\text{result}(n) = \sum\nolimits_{1}^{l}\left[\frac{1}{N}\sum\nolimits_{i=(n-1)N+1}^{nN}\left(\frac{(x_l(i) - m_l^1(i-1))}{m_l^2(i-1)}\right)^2\right],$$

where l represents the number of sub-wavelet decomposition signals included in the first wavelet decomposition signal, N represents the number of samples included in each sub-wavelet decomposition signal, n represents a frame index indicating the $n^{th}$ audio frame signal, $x_l(i)$ represents an audio intensity value of the $l^{th}$ sub-wavelet decomposition signal at the $i^{th}$ sample in a wavelet decomposition signal, $m_l^1(i-1)$ represents an average of audio intensity values till the $(i-1)^{th}$ sample in the $l^{th}$ sub-wavelet decomposition signal, $m_l^2(i-1)$ represents a variance of audio intensity values till the $(i-1)^{th}$ sample in the $l^{th}$ sub-wavelet decomposition signal.

In one possible implementation, determining the probability that the first audio frame signal is transient noise according to the energy distribution information of the first wavelet decomposition signal includes: obtaining a first average of audio intensity values of all samples in a first sub-wavelet decomposition signal and a second average of audio intensity values of all samples in a second sub-wavelet decomposition signal; and determining the probability that the first audio frame signal is transient noise according a ratio between the first average and the second average.

In one possible implementation, the second probability is expressed as $$p_s(n) = \frac{1}{1 + e^{thr_g(thr_s - s_c(n))}},$$

where $thr_g$ represents a second preset threshold, $thr_s$ represents a third preset threshold, n represents a frame index indicating the $n^{th}$ audio frame signal, $S_c(n)$ represents an average reference audio intensity value of the $n^{th}$ audio frame signal.

In one possible implementation, before obtaining the first audio signal, the method further includes: compensating high-frequency components of a first preset threshold in an original audio signal having the preset duration to obtain the first audio signal.

In one possible implementation, performing wavelet decomposition on each audio frame signal includes: performing wavelet packet decomposition on each audio frame signal and using a signal obtained through wavelet packet decomposition as the wavelet decomposition signal.

In a second aspect, an apparatus for transient noise detection is provided. The apparatus includes an obtaining module, a decomposition module, and a determining module.

The obtaining module configured to obtain a first audio frame signal having a preset duration, the first audio frame signal includes a plurality of samples and an audio intensity value of each sample.

The decomposition module configured to perform wavelet decomposition on a first audio frame signal to obtain a first wavelet decomposition signal corresponding to the first audio frame signal, the first wavelet decomposition signal includes a plurality of sub-wavelet decomposition signals, and each sub-wavelet decomposition signal includes a plurality of samples and an audio intensity value of each sample.

The determining module is configured to determine a first reference audio intensity value of a first sub-wavelet decomposition signal according to reference audio intensity values of all samples in the first sub-wavelet decomposition signal.

The determining module is further configured to determine energy distribution information of the first wavelet decomposition signal according to first reference audio intensity values of all sub-wavelet decomposition signals in the first wavelet decomposition signal.

The determining module is further configured to determine a probability that the first audio frame signal is transient noise according to the energy distribution information of the first wavelet decomposition signal.

In a third aspect, a device for effective voice signal detection is provided. The device includes a transceiver, a processor, and a memory. The transceiver is coupled with the processor and the memory. The processor is coupled with the memory. The processor is configured to execute computer programs stored in the memory to carry out the method in any of the foregoing implementations.

In a fourth aspect, a non-transitory computer readable storage medium is provided. The non-transitory computer storage medium stores instructions which, when executed by the processor, are operable with the processor to carry out steps of the method in the foregoing aspects.

DETAILED DESCRIPTION

Technical solutions in embodiments of the disclosure will be clearly and completely described below in combination with the accompanying drawings of the disclosure. Obviously, the described embodiments are only part rather than all of the embodiments of the disclosure. Based on the embodiments provided herein, all other embodiments obtained by those skilled in the art without creative work belong to the protection scope of the application.

Disclosed herein are a method, apparatus, and device for transient noise detection, which count a preset number of continuous samples of a sub-wavelet decomposition signal in a wavelet decomposition signal corresponding to an audio frame signal and determine the probability that the audio frame signal is transient noise in a more refined time dimension, the accuracy of transient noise detection is therefore improved.

Implementations of the technical scheme of the present application is further described in detail below in combination with the accompanying drawings.

A method for transient noise detection provided herein will be described with reference to FIG. 1 to FIG. 7.

Figure 1:
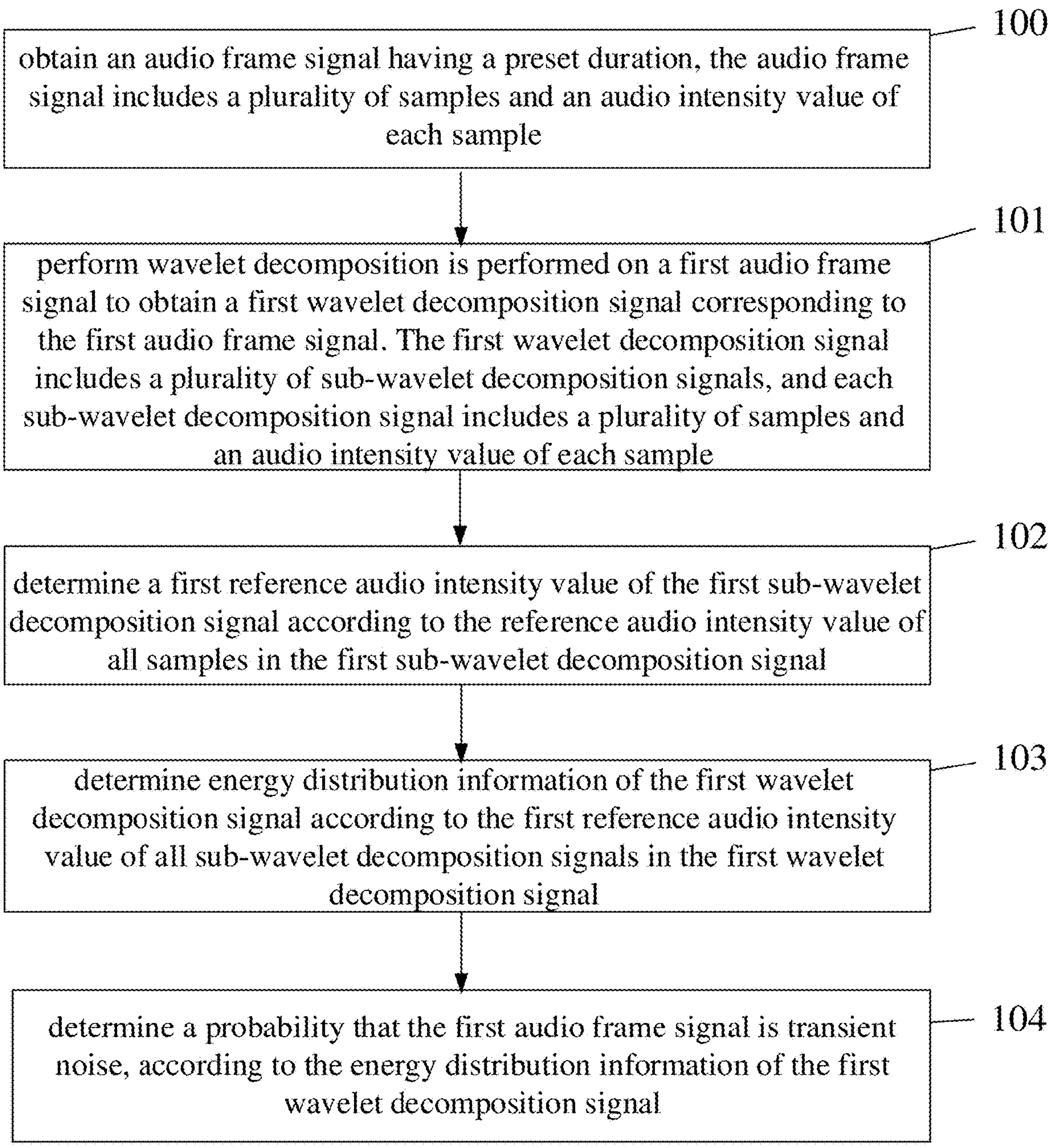
FIG. 1 is a schematic flowchart of a method for transient noise detection provided in implementations of the disclosure.

FIG. 1 is a schematic flowchart of the method for transient noise detection provided in implementations of the disclosure. As illustrated in FIG. 1, the method begins at block 100 and then proceeds to block 101, 102, 103, and 104.

At 100, an audio frame signal having a preset duration is obtained, the audio frame signal includes a plurality of samples and an audio intensity value of each sample. The audio frame signal can be referred to as first audio frame signal for explanation purpose. Specifically, an apparatus for transient noise detection obtains the audio frame signal having the preset duration, the preset duration can be comprehended as the frame length of the audio frame signal. The apparatus for transient noise detection obtains an original audio signal. Because the oral muscle movement is relatively slow relative to the audio frequency, and the audio signal is relatively stable in a short time range, the audio signal has short-term stability. Therefore, according to the short-term stability of the audio signal, framing can be performed on the audio signal to obtain audio frame signals each having a preset duration for detection. Optionally, there is no overlap between the audio frame signals, the size of frame shift is the size of frame length. Frame shift refers to an overlapping portion of a previous frame signal and a next frame signal. When the frame length equals to the frame shift, there is no overlap between audio frames. In one possible implementation, the apparatus for transient noise detection samples the audio signals at a frequency of 32 kHz, that is, 32 samples are collected in one second. Framing is performed on an audio signal with the frame length of 10 ms and the frame shift of 10 ms. One audio frame signal having a preset duration of 10 ms is obtained, each audio frame signal includes 320 samples and an audio intensity value corresponding to each sample.

At 101, wavelet decomposition is performed on a first audio frame signal to obtain a first wavelet decomposition signal corresponding to the first audio frame signal. The first wavelet decomposition signal includes a plurality of sub-wavelet decomposition signals, and each sub-wavelet decomposition signal includes a plurality of samples and an audio intensity value of each sample. Specifically, the audio frame signal is obtained at 100, then wavelet decomposition is performed on the first audio frame signal. Wavelet decomposition will be described below with reference to the accompanying drawings.

Figure 2:
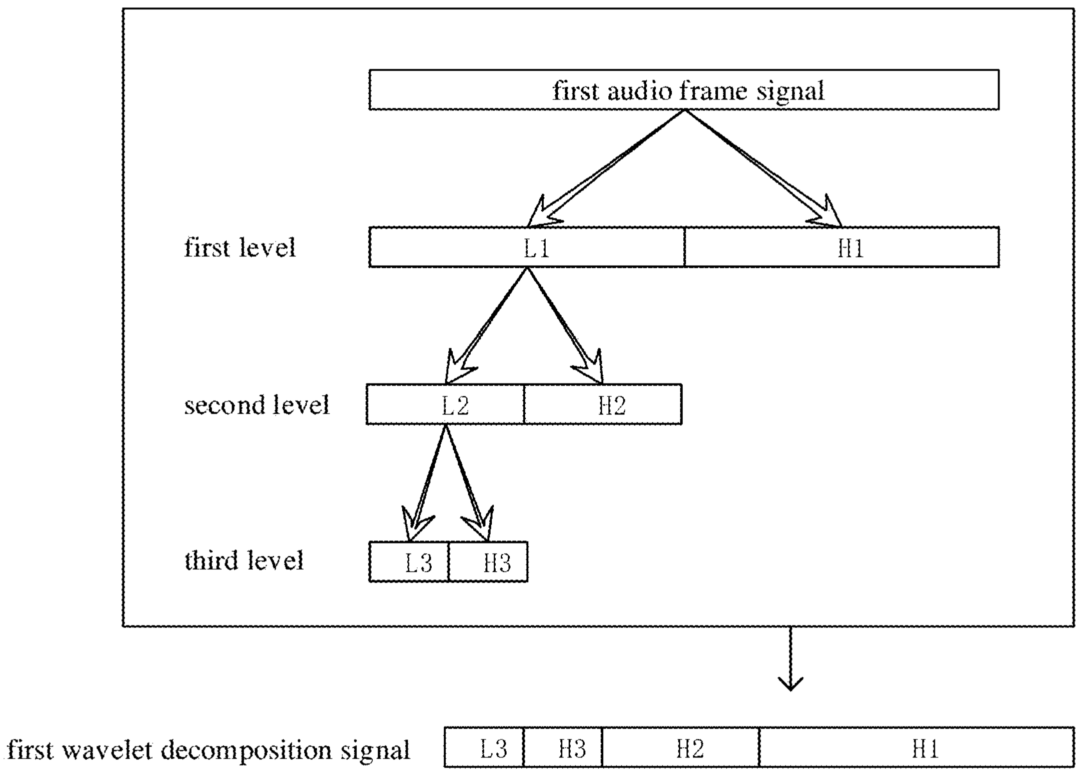
FIG. 2 is a structural diagram of wavelet decomposition provided in implementations of the disclosure.
Figure 3:
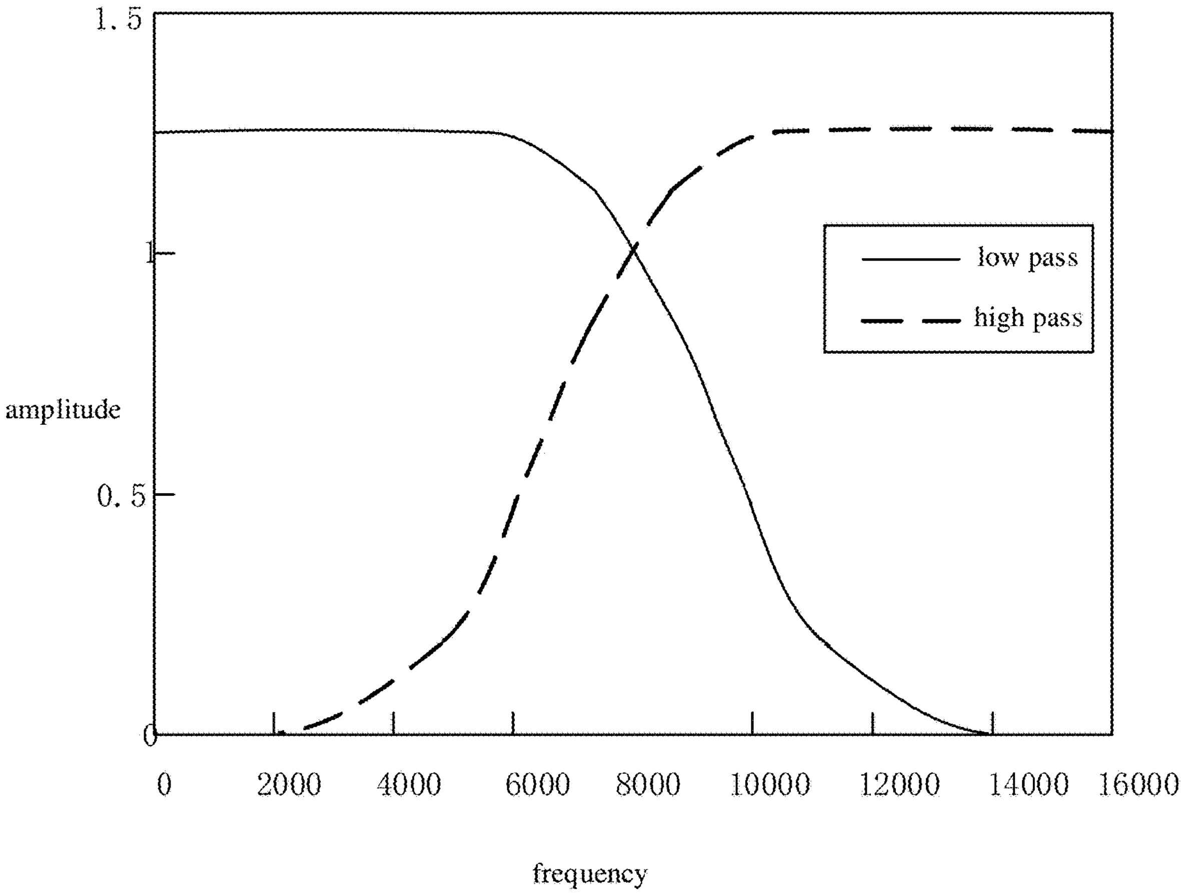
FIG. 3 is an amplitude frequency characteristic curve of a high-and-low pass filter provided in implementations of the disclosure.
Figure 4:
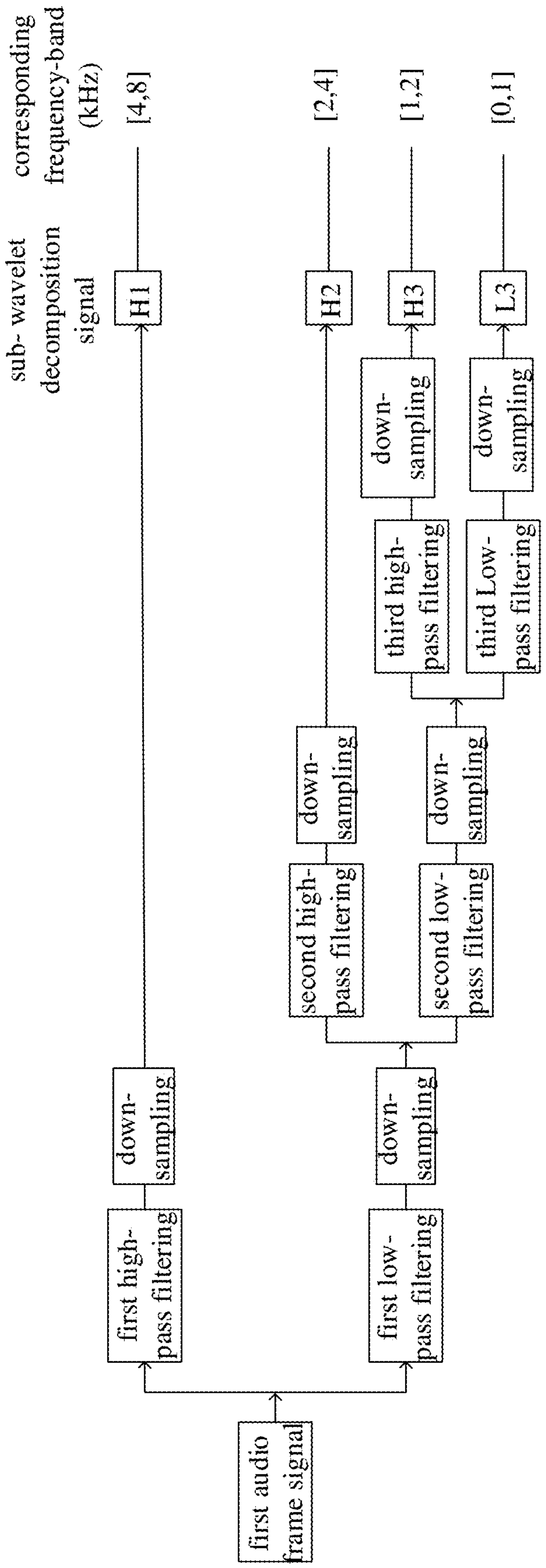
FIG. 4 is a diagram of wavelet decomposition processing provided in implementations of the disclosure.

Referring to FIG. 2 to FIG. 4, FIG. 2 is a structural diagram of wavelet decomposition provided in implementations of the disclosure. As illustrated in FIG. 2, wavelet decomposition is performed on the audio frame signal obtained through framing of the audio signal. The first audio frame signal will be taken as an example. It can be understood that, the wavelet decomposition can be considered as high-and-low pass filtering. High-and-low filtering characteristics can refer to FIG. 3, which is an amplitude frequency characteristic curve of a high-and-low pass filter provided in implementations of the disclosure. It can be understood that, the high-and-low filtering characteristics vary according to the selected filter model, exemplary, 16-tap Dubechies8 wavelet can be selected. A first level wavelet decomposition signal can be obtained through the high-and-low pass filter illustrated in FIG. 3. The first level wavelet decomposition signal includes low-frequency information L1 and high-frequency information H1. The low-frequency information L1 in the first level wavelet decomposition signal is high-and-low pass filtered to obtain low-frequency information L2 and high-frequency information H2 in a second level wavelet decomposition signal. The low-frequency information L2 in the second level wavelet decomposition signal is high-and-low pass filtered to obtain low-frequency information L3 and high-frequency information H3 in a third level wavelet decomposition signal, and so on. As such, multi-level wavelet decomposition is performed on the input signal, and here provided is only an example. It can be understood that, L3 and H3 contains all information of L2, L2 and H2 contains all information of L1, and L1 and H1 contains all information of the first audio frame signal. Therefore, a sub-wavelet signal sequence obtained by splicing of L3, H3, H2, and H1 can represent the first audio frame signal. Sub-wavelet signal sequences of multiple audio frame signals are spliced according to a framing order of the first audio signal, to form a wavelet signal sequence representing the audio signal. As can be seen, the low-frequency component in the first audio frame signal is refined and analyzed after wavelet decomposition, the resolution is improved, has a relatively wide analysis window in the low-frequency band, and has excellent local microscopic characteristics.

The wavelet decomposition process will be described in detail. Exemplary, wavelet decomposition is performed on one audio frame signal. Referring to FIG. 4, and FIG. 4 is a diagram of wavelet decomposition processing provided in implementations of the disclosure. As illustrated in FIG. 4, wavelet decomposition is performed on the first audio frame signal. In one possible implementation, in order to make sure that the number of samples after wavelet decomposition is the same as that of the original audio frame signal, down-sampling can be performed on a signal obtained through high-pass filtering and low-pass filtering. Framing is performed on the audio signal with a sampling frequency of 32 kHz, a frame shift of 10 ms, and a frame length of 10 ms. Each audio frame signal includes 320 samples. Wavelet decomposition is performed on each audio frame signal, the number of samples after a first high-pass filtering is 320, and the number of samples after a first low-pass filtering is also 320, and they constitute the first level wavelet decomposition signal. Down-sampling is performed on the signal after the first low-pass filtering, and a sampling frequency after the first low-pass filtering is half of the sampling frequency of the first audio frame signal, and the number of samples after the first low-pass filtering and down-sampling is 160. Similarly, the number of samples after the first high-pass filtering and down-sampling is 160. The number of samples in the first level wavelet decomposition signal is 320, which is the sum of the number of samples after the first low-pass filtering down-sampling and the number of samples after the first high-pass filtering down-sampling, and equals to the number of samples in one audio frame signal. In a similar way, a second high-pass filtering and a second low-pass filtering are performed on the signal after the first low-pass filtering and down-sampling, and down-sampling is then performed, a total number of samples thus obtained is the number of samples after the first low-pass filtering and down-sampling. A third high-pass filtering and a third low-pass filtering are performed on the signal after the second low-pass filtering and down-sampling, and down-sampling is then performed, a total number of samples thus obtained is the number of samples after the second low-pass filtering and down-sampling. As can be seen, the number of samples included in the sub-wavelet signal sequence obtained through wavelet decomposition of the first audio frame signal is the number of samples in the first audio frame signal. It can be understood that, according to double sampling theorem, the sampling frequency is twice the maximum frequency of the audio signal, then the maximum frequency corresponding to the audio signal obtained with a sampling frequency of 32 kHz is 16 kHz. A first level wavelet decomposition is performed on the first audio frame signal to obtain a first level wavelet decomposition signal. The first level wavelet decomposition signal includes a signal obtained after the first high-pass filtering and down-sampling and a signal obtained after the first low-pass filtering and down-sampling. The signal obtained after the first low-pass filtering and down-sampling corresponds to a frequency band of 0~8 kHz, and a sub-wavelet decomposition signal H1 obtained after the first high-pass filtering and down-sampling corresponds to a frequency band of 8~16 kHz. A second level wavelet decomposition is performed on the first level wavelet decomposition signal to obtain a second level wavelet decomposition signal. Specifically, a second high-pass filtering and a second low-pass filtering are performed on a signal obtained after the first low-pass filtering and down-sampling. Sub-wavelet decomposition signal H2 obtained after the second high-pass filtering and down-sampling corresponds to a frequency band of 4~8 kHz, a signal obtained after the second low-pass filtering and down-sampling corresponds to a frequency band of 0~4 kHz. A third level wavelet decomposition is performed on the second level wavelet decomposition signal to obtain a third level wavelet decomposition signal. Specifically, a third high-pass filtering and a third low-pass filtering are performed on a signal obtained after the second low-pass filtering and down-sampling. Sub-wavelet decomposition signal H3 obtained after the third high-pass filtering and down-sampling corresponds to a frequency band of 2~4 kHz, sub-wavelet decomposition signal L3 obtained after the third low-pass filtering and down-sampling corresponds to a frequency band of 0~2 kHz, and so on. Three-level wavelet decomposition is described as an example. In one possible implementation, the first level wavelet decomposition signal, the second level wavelet decomposition signal, and the third level wavelet decomposition signal can be obtained through high-and-low pass filtering by the same type of filter. Sub-wavelet decomposition signals H1, H2, H3, and H4 can be spliced into a sub-wavelet signal sequence, which is a wavelet decomposition signal of the first audio frame signal.

In one possible implementation, performing wavelet decomposition on each audio frame signal includes: performing wavelet packet decomposition on each audio frame signal and using a signal obtained through wavelet packet decomposition as the wavelet decomposition signal.

Figure 5:
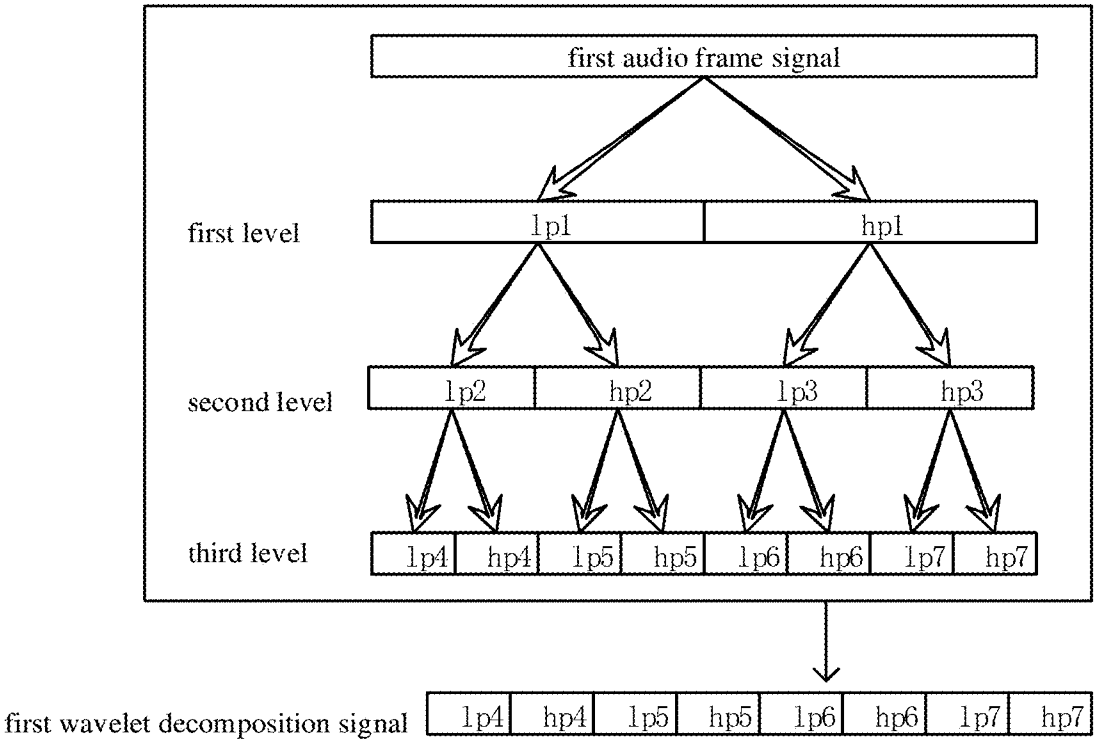
FIG. 5 is a structural diagram of wavelet packet decomposition provided in implementations of the disclosure.
Figure 6:
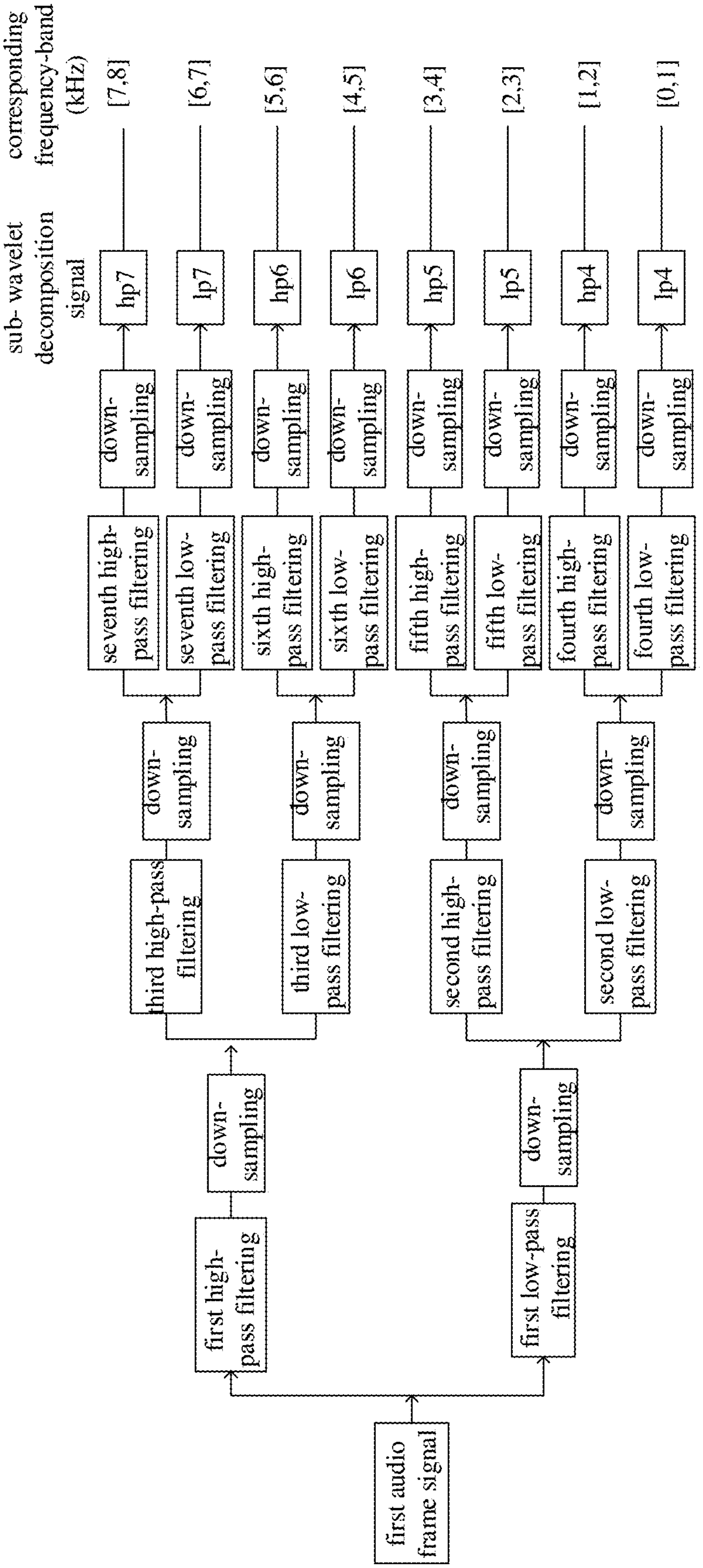
FIG. 6 is a diagram of wavelet packet decomposition processing provided in implementations of the disclosure.

Wavelet decomposition will be detailed below and reference can be made to FIG. 5 to FIG. 6. Referring to FIG. 5, which is a structural diagram of wavelet packet decomposition provided in implementations of the disclosure. As illustrated in FIG. 5, wavelet packet decomposition can be performed on audio frame signals obtained through framing of an audio signal, the first audio frame signal will be taken as an example for illustration purpose. It can be understood that the wavelet packet decomposition can also be considered as a high-low-pass filtering process, and high-low-pass filtering characteristics can refer to FIG. 3. Optionally, the type of the filter can be 16 tap daubechies8 wavelet. The wavelet packet decomposition differs from the wavelet decomposition in that wavelet packet decomposition can decompose both low-frequency and high-frequency signals and therefore, for signals containing a large amount of intermediate-frequency information and high-frequency information, wavelet packet decomposition can perform better time-frequency localization analysis. A first level wavelet decomposition signal is obtained through high-low-pass filtering, the first level wavelet decomposition signal contains low-frequency information lp1 and high-frequency information hp1. High-low-pass filtering is performed on the low-frequency information lp1 in the first level wavelet decomposition signal to obtain low-frequency information lp2 and high-frequency information hp2. Different from wavelet decomposition, wavelet packet decomposition will perform high-low-pass filtering on the high-frequency information obtained after decomposition. Therefore, high-low-pass filtering is performed on high-frequency information hp1 in the first level wavelet decomposition signal to obtain low-frequency information lp3 and hp3. The low-frequency information in the second level wavelet decomposition signal includes lp2 and lp3, and high-frequency information in the second level wavelet decomposition signal includes hp2 and hp3. High-low-pass filtering is performed on low-frequency information lp2 and lp3 as well as high-frequency information hp2 and hp3 of the second level wavelet decomposition signal respectively to obtain a third level wavelet decomposition signal. The third level wavelet decomposition signal contains low-frequency information lp4, lp5, lp6, and lp7 as well as high-frequency information hp4, hp5, hp6, and hp7. As such, multi-level wavelet decomposition can be performed on an input signal, an illustrative example is given here. As illustrated in FIG. 5, lp4 and hp4 contain all information of lp2, lp5 and hp5 contain all information of hp2, and lp2 and hp2 contain all information of lp1, it can be understood that, lp4, hp4, lp5, and hp5 contain all information of lp1, lp6 and hp6 contain all information of lp3, lp7 and hp7 contain all information of hp3, and lp3 and hp3 contain all information of hp1, it can be understood that, lp6, hp6, lp7, and hp7 contain all information of hp1. Since lp1 and hp1 contain all information of the first audio frame signal, a sub-wavelet signal sequence obtained through splicing of lp4, hp4, lp5, hp5, lp6, hp6, lp7, and hp7 can represent the first audio frame signal. Sub-wavelet signal sequences of all audio frame signals are spliced according to a framing order of audio frames in the first audio signal to obtain a wavelet signal sequence representing the audio signal. As such, after wavelet decomposition of the first audio frame signal, the resolution of both high frequency band and low frequency band is improved.

Process of wavelet packet decomposition in implementations of the disclosure will be detailed below. Exemplarily, wavelet packet decomposition is performed on one audio frame signal. Specifically, referring to FIG. 6, which is a diagram of wavelet packet decomposition processing provided in implementations of the disclosure. As illustrated in FIG. 6, wavelet packet decomposition is performed on the first audio frame signal. In one possible implementation, to make the number of samples after wavelet packet decomposition the same as that of the original audio frame signal, down-sampling can be performed on the signal obtained after high-pass filtering and low-pass filtering. Framing is performed on the audio signal with a sampling frequency of 32 kHz, a frame shift of 10 ms, and a frame length of 10 ms. Each audio frame signal contains 320 samples. Wavelet packet decomposition is performed on each audio frame signal, the number of samples after the first high-pass filtering is 320, the number of samples after the first low-pass filtering is also 320. Signals obtained after the first high-pass filtering and the first low-pass filtering constitute a first level wavelet decomposition signal of wavelet packet decomposition. Down-sampling is performed on the signal after the first low-pass filtering, and the sampling frequency after the first low-pass filtering down-sampling is half of the sampling frequency of the first audio frame signal, and the number of samples after the first low-pass filtering is 160. Similarly, the number of samples after the first high-pass filtering down-sampling is 160, and the number of samples in the first level wavelet decomposition signal is the sum of the number of samples after the first low-pass filtering down-sampling and the number of samples after the first high-pass filtering down-sampling, that is, 320, which is the same as the number of samples in one audio frame signal. And so on. Second high-pass filtering and second low-pass filtering as well as down-sampling are performed on the signal obtained after the first low-pass filtering down-sampling, the number of samples thus obtained is the number of samples after the first low-pass filtering down-sampling. Third high-pass filtering and third low-pass filtering as well as down-sampling are performed on the signal obtained after the first high-pass filtering down-sampling, the sum of the number of samples thus obtained is the number of samples after the first high-pass filtering down-sampling. Fourth high-pass filtering and fourth low-pass filtering as well as down-sampling are performed on the signal after the second low-pass filtering down-sampling, the number of samples thus obtained is the number of samples after the second low-pass filtering down-sampling. Fifth high-pass filtering and fifth low-pass filtering as well as down-sampling are performed on the signal after the second high-pass filtering down-sampling, the sum of the number of samples thus obtained is the number of samples after the second high-pass filtering down-sampling. Sixth high-pass filtering and sixth low-pass filtering as well as down-sampling are performed on the signal after the third low-pass filtering down-sampling, the sum of the number of samples thus obtained is the number of samples after the third low-pass filtering down-sampling. Seventh high-pass filtering and seventh low-pass filtering as well as down-sampling are performed on the signal after the third high-pass filtering down-sampling, the sum of the number of samples thus obtained is the number of samples after the third high-pass filtering down-sampling. As can be seen, the number of samples included in a sub-wavelet signal sequence obtained through wavelet packet decomposition on the first audio frame signal is the number of samples of the first audio frame. It can be understood that, according to double sampling theorem, the sampling frequency is twice the maximum frequency of the audio signal, then the maximum frequency corresponding to the audio signal obtained with a sampling frequency of 32 kHz is 16 kHz. A first level wavelet packet decomposition is performed on the first audio frame signal to obtain a first level wavelet decomposition signal. The first level wavelet decomposition signal includes a signal obtained after the first high-pass filtering and down-sampling and a signal obtained after the first low-pass filtering and down-sampling. A signal obtained after the first low-pass filtering and down-sampling corresponds to a frequency band of 0~8 kHz, and a signal obtained after the first high-pass filtering and down-sampling corresponds to a frequency band of 8~16 kHz. A second level wavelet packet decomposition is performed on the first level wavelet decomposition signal to obtain a second level wavelet decomposition signal. The second level wavelet decomposition signal includes a signal after a second low-pass filtering down-sampling, a signal after a second high-pass filtering down-sampling, a signal after a third low-pass filtering down-sampling, and a signal after a third high-pass filtering. Specifically, a second high-pass filtering and a second low-pass filtering are performed on a signal obtained after the first low-pass filtering and down-sampling. A signal after the second high-pass filtering and down-sampling corresponds to a frequency band of 4~6 kHz, a signal obtained after the second low-pass filtering and down-sampling corresponds to a frequency band of 0~4 kHz. A third high-pass filtering and a third low-pass filtering are performed on a signal obtained after the first high-pass filtering and down-sampling, and a signal obtained after the third high-pass filtering and down-sampling corresponds to a frequency-band of 12 kHz~16 kHz. A signal obtained after the third low-pass filtering and down-sampling corresponds to a frequency band of 8 kHz~12 kHz. A third level wavelet packet decomposition is performed on the second level wavelet decomposition signal to obtain a third level wavelet decomposition signal. The third level wavelet decomposition signal includes a signal after a fourth low-pass filtering down-sampling, a signal after a fourth high-pass filtering down-sampling, a signal after a fifth low-pass filtering down-sampling, a signal after a fifth high-pass filtering down-sampling, a signal after a sixth low-pass filtering down-sampling, a signal after a sixth high-pass filtering down-sampling, a signal after a seventh low-pass filtering down-sampling, and a signal after a seventh high-pass filtering down-sampling. Specifically, a fourth high-pass filtering and a fourth low-pass filtering are performed on a signal obtained after the second low-pass filtering and down-sampling. A sub-wavelet decomposition signal hp4 obtained after the fourth high-pass filtering and down-sampling corresponds to a frequency band of 2~4 kHz. A fifth low-pass filtering and a fifth high-pass filtering are performed on a wavelet packet signal obtained after the second high-pass filtering down-sampling, a sub-wavelet decomposition signal lp5 obtained after the fifth low-pass filtering down-sampling corresponds to a frequency-band of 4~6 kHz, a sub-wavelet decomposition signal hp5 obtained after the fifth high-pass filtering down-sampling corresponds to a frequency-band of 6~8 kHz. Similarly, a sixth low-pass filtering and a sixth high-pass filtering are performed on a signal obtained after the third low-pass filtering down-sampling, a sub-wavelet decomposition signal lp6 obtained after the sixth low-pass filtering down-sampling corresponds to a frequency-band of 8~10 kHz, a sub-wavelet decomposition signal hp6 obtained after the sixth high-pass filtering down-sampling corresponds to a frequency-band of 10~12 kHz. A seventh low-pass filtering and a seventh high-pass filtering are performed on a signal obtained after the third high-pass filtering down-sampling, a sub-wavelet decomposition signal lp7 obtained after the seventh low-pass filtering down-sampling corresponds to a frequency-band of 12~14 kHz, a sub-wavelet decomposition signal hp7 obtained after the seventh high-pass filtering down-sampling corresponds to a frequency-band of 14~16 kHz. And so on. Three-level wavelet packet decomposition is described as an example. Different from wavelet decomposition, in wavelet packet decomposition, high-low-pass filtering is further performed on the high-frequency signal in each level signal obtained after high-pass filtering. Sub-wavelet decomposition signal lp4, hp4, lp5, hp5, lp6, hp6, lp7, and hp7 in the third level wavelet decomposition signal can be spliced into a sub-wavelet signal sequence as a wavelet decomposition signal of the first audio frame signal. In one possible implementation, the first level wavelet decomposition signal, the second level wavelet decomposition signal, and the third level wavelet decomposition signal can be obtained through high-and-low pass filtering by the same type of filter. It can be understood that, the sub-wavelet decomposition signal is a sub-signal of the last level wavelet decomposition or wavelet packet decomposition, and each sub-wavelet decomposition signal maps to one frequency band.

At 102, a first reference audio intensity value of the first sub-wavelet decomposition signal is determined according to the reference audio intensity value of all samples in the first sub-wavelet decomposition signal. Specifically, the reference audio intensity value includes an average and a variance of frequency intensities of a fifth preset number of consecutive samples.

Exemplarily, the fifth preset number is 3N−1, and the average $\widehat{\mu_l}$ (i) and the variance $\hat{\Sigma}_l$(i) of frequency intensities of the fifth preset number of consecutive samples are expressed as:

$$\widehat{\mu_l}(i) = m_l^1(i) = \sum_{j=i-(3N-1)}^{i} \frac{x_l(j)}{3N} \quad \text{Formula 1}$$

$$\hat{\sum}_l(i) = m_l^2(i) = \sum_{j=i-(3N-1)}^{i} \frac{x_l^2(j)}{3N} \quad \text{Formula 2}$$

1 represents the number of sub-wavelet decomposition signals included in the first wavelet decomposition signal. N represents the number of samples in each sub-wavelet decomposition signal. Optionally, the sampling frequency of the first audio frame signal is 32 kHz, the frame length of the audio frame is 10 ms, and the number of samples is 320. After three level wavelet decomposition or wavelet packet decomposition, the number of all samples in each sub-wavelet decomposition signal is N=40. $x_l$(j) represents the audio intensity value of the $j^{th}$ sample after the $1^{th}$ sub-wavelet decomposition signal is spliced into a sub-wavelet signal sequence. j represents an index of a sample in the sub-wavelet signal sequence. From j=i−(3N−1) to i, meaning that the average and the variance are calculated from the audio intensity values of the first 3N−1 samples prior to the $i^{th}$ sample, and representing the accumulation of three sub wavelet decomposition signals. $\widehat{\mu_l}$ (i) can be understood as the short-time average of all samples at the position of the $i^{th}$ sample in the $1^{th}$ sub-wavelet decomposition signal. $\hat{\Sigma}_l$(i) can be understood as the short-time variance of all samples at the position of the $i^{th}$ sample in the $l^{th}$ sub-wavelet decomposition signal. It should be noted that the variance represented by $\hat{\Sigma}_l(i)$ is the variance in a broad sense, not the variance minus the average in the strict sense of mathematics. In this implementation, $\hat{\Sigma}_l(i)$ simply square the audio intensity value of the samples to obtain the degree of dispersion between the samples. $m_l^1(i)$ represents an average of audio intensity values till the $i^{th}$ sample in the $l^{th}$ sub-wavelet decomposition signal. Mathematically, $m_l^1(i)$ represents the first order moment of an expected value of an variable, and in this disclosure it can be understood as $\hat{\mu}_l(i)$. $m_l^2(i)$ represents a variance of audio intensity values till the $i^{th}$ sample in the $l^{th}$ sub-wavelet decomposition signal. Mathematically, $m_l^2(i)$ represents the second order moment of an expected value of an variable, and in this disclosure it can be understood as $\hat{\Sigma}_l(i)$. According to the average $m_l^1(i)$ and variance $m_l^2(i)$ of audio intensity values of all samples in the first sub-wavelet decomposition signal, the first reference audio intensity value $monent_n(l)$ of the first sub-wavelet decomposition signal can be determined as:

$$moment_n(l) = \frac{1}{N}\sum_{i=(n-1)N+1}^{nN} \frac{\left(x_l(i) - m_l^1(i-1)\right)^2}{m_l^2(i-1)} \quad \text{Formula 3}$$

$x_l(i)$ represents the audio intensity value of the $i^{th}$ sample in the wavelet decomposition signal of the lth sub-wavelet decomposition signal. i represents an index of a sample in a wavelet signal sequence. It can be understood that, j represents an index of a sample in a sub-wavelet signal sequence and is a temporary variable, i represents an index of a sample in a wavelet signal sequence. Optionally, i≥j.

At 103, energy distribution information of the first wavelet decomposition signal is determined according to the first reference audio intensity value of all sub-wavelet decomposition signals in the first wavelet decomposition signal. Specifically, calculates the sample distribution of all samples in the first sub-wavelet decomposition signal to estimate distribution concentration degree of the first audio frame signal. The first reference audio intensity value of all sub-wavelet decomposition signals in the sub-wavelet decomposition signal is obtained at step 102. Optionally, the energy distribution information of the first wavelet decomposition signal is determined according to the average of the first reference audio intensity value of all sub-wavelet decomposition signals in the first wavelet decomposition signal.

In one possible implementation, for example, three-level wavelet decomposition is performed on the first audio frame signal. The first level wavelet decomposition signal corresponding to the first audio frame signal includes eight sub-wavelet decomposition signals. According to the first reference audio intensity value $moment_n(l)$ of all sub-wavelet decomposition signals in the first sub-wavelet decomposition signal, the energy distribution information result(n) of the first wavelet decomposition signal is determined as:

$$\text{result}(n) = \sum_{l=1}^{8} moment_n(l) = \sum_{1}^{l}\left[\frac{1}{N}\sum_{i=(n-1)N+1}^{nN} \frac{\left(x_l(i) - m_l^1(i-1)\right)^2}{m_l^2(i-1)}\right] \quad \text{Formula 4}$$

l represents the number of sub-wavelet decomposition signals contained in the first wavelet decomposition signal. Optionally, l=8. N is the number of points included in each sub-wavelet decomposition signal. n represents a frame index and indicates the $n^{th}$ audio frame signal. $x_l(i)$ represents the audio intensity value of the $i^{th}$ sample in the $l^{th}$ sub-wavelet decomposition signal. $m_l^1(i-1)$ represents an average of audio intensity values till the $(i-1)^{th}$ sample in the $l^{th}$ sub-wavelet decomposition signal, $m_l^2(i-1)$ represents a variance of audio intensity values till the $(i-1)^{th}$ sample in the $l^{th}$ sub-wavelet decomposition signal.

At 104, according to the energy distribution information of the first wavelet decomposition signal, a probability that the first audio frame signal is transient noise is determined. Specifically, the energy distribution information of the first wavelet decomposition signal is obtained at step 103, and the energy distribution information represents a possible degree that a first audio frame signal corresponding to the first wavelet decomposition signal is transient noise. The energy distribution information is a value, which may be greater than 1. The probability that the first audio frame signal is transient noise is defined in a range from 0 to 1 according to the energy distribution information of the first wavelet decomposition signal.

According to the implementation, by counting the preset number of continuous samples in the wavelet decomposition signals corresponding to the audio frame signal and using the local microscopic characteristics of wavelet decomposition or wavelet packet decomposition, the audio frame signal can be detected in a finer time-dimension, and the accuracy of transient noise detection is improved.

In a possible implementation, the probability res(n) that the first audio frame signal is transient noise is determined according to the energy distribution information result(n) of the first wavelet decomposition signal as follows:

$$res(n) = \left[\frac{1}{2}\left(\cos\left(\text{result}(n) \times \frac{\pi}{\lambda} + \pi\right) + 1\right)\right]^2 \quad \text{Formula 5}$$

n represents the frame index and indicates the $n^{th}$ audio frame signal, λ represents a first preset threshold, result(n) is a specific value and represents the energy distribution information of a wavelet decomposition signal corresponding to the $n^{th}$ audio frame signal. If the value of result(n) is greater than the first preset threshold, then the probability that the first audio frame signal is transient noise is 1.

In another possible implementation, the probability res(n) that the first audio frame signal is transient noise is determined according to the energy distribution information result(n) of the first wavelet decomposition signal as follows:

$$res(n) = \frac{1}{2}\left[\cos\left(\text{result}(n) \times \frac{\pi}{\lambda} + \pi\right) + 1\right] \quad \text{Formula 6}$$

n represents the frame index and indicates the $n^{th}$ audio frame signal, λ represents a first preset threshold, result(n) is a specific value and represents the energy distribution information of the first wavelet decomposition signal. If the value of result(n) is greater than the first preset threshold, then the probability that the first audio frame signal is transient noise is 1.

Formula 5 differs from Formula 6 in that, in Formula 5, square operation is performed, and the steepness of the curve is different. In the above two implementations, the probability that the first audio frame signal is transient noise can be defined in a range from 0 to 1, and the effect is shown in FIG.

Figure 7:
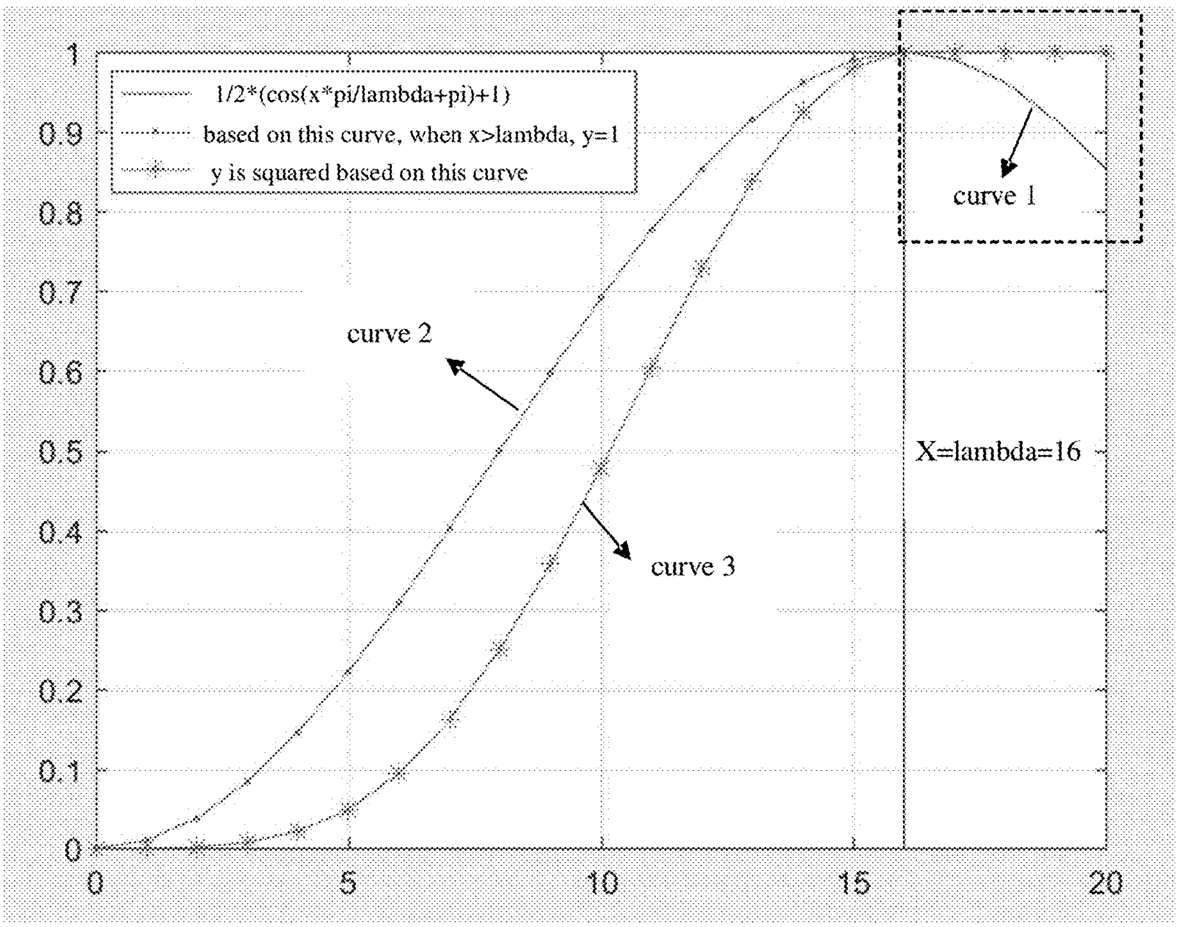
FIG. 7 is a diagram of a transient noise probability determination curve provided in implementations of the disclosure.

7. FIG. 7 is a diagram of a transient noise probability determination curve provided in implementations of the disclosure. As illustrated in FIG. 7, the horizontal axis represents the energy distribution information of the first wavelet decomposition signal, and the vertical axis represents the probability that the first audio frame signal is transient noise. Curve 1 is the curve of Formula 6. As can be seen from FIG. 7, when the value of energy distribution information result(n) of the first wavelet decomposition signal is greater than the first preset threshold, the probability that the first audio frame signal is transient noise decreases, closes to 1. Exemplary, as illustrated in FIG. 7, the first preset threshold is 16, when the value of energy distribution information result(n) of the first wavelet decomposition signal is greater than the first preset threshold, the probability that the first audio frame signal is transient noise is 1. Optionally, λ=16, curve 1 changes to curve 2. Optionally, to make the change of the probability of transient noise more steeply and highlight the energy distribution information of the first wavelet decomposition signal and the distribution of the probability that the first audio frame signal is transient noise, square operation is performed on the basis of Formula 6, and curve 2 changes to curve 3, such that the probability that the first audio frame signal is transient noise changes more obviously with the energy distribution information of the first wavelet decomposition signal.

In a possible implementation, transient noise can be detected as follows. Obtain a first average of audio intensity values of all samples in a first sub-wavelet decomposition signal and obtain a second average of audio intensity values of all samples in a second sub-wavelet decomposition signal, and determined the probability that the first audio frame signal is transient noise according to a ratio between the first average and the second average. Specifically, the first sub-wavelet decomposition signal and the second sub-wavelet decomposition signal correspond to different frequency bands of an audio frame signal, and the main frequency band of a human voice signal mainly falls into the range of 300 Hz to 3400 Hz, and distribution of transient noise in the whole frequency band is relatively even. Exemplary, the first sub-wavelet decomposition signal corresponds to a frequency band of 0~2 kHz, and the second sub-wavelet decomposition signal corresponds to a frequency band of 2~4 kHz. A ratio between the average of audio intensity values of all samples in the first sub-wavelet decomposition signal and the average of audio intensity values of all samples in the second sub-wavelet decomposition signal is determined, and the probability that the first audio frame signal is transient noise is determined according to the ratio of the first sub-wavelet decomposition signal and the second sub-wavelet decomposition signal. In one possible implementation, the wavelet decomposition signal corresponding to the audio frame signal includes multiple sub-wavelet decomposition signals. Optionally, ratios between any two sub-wavelet decomposition signals among all sub-wavelet decomposition signals in the wavelet decomposition signal is obtained, and the probability that the audio frame signal is transient noise is determined according to an average of the ratios.

In one possible implementation, the probability that the first audio frame signal is transient noise and the probability that the second audio frame signal is transient noise are determined, and the second audio frame signal is a previous audio frame signal of the first audio frame signal. Obtain a first smoothing probability according to the probability that the first audio frame signal is transient noise and the probability that the second audio frame signal is transient noise, and use the first smoothing probability as the probability that the first audio frame signal is transient noise. Specifically, to reduce the burr effect of transient noise probability distribution and ensure that detected transient noise has relatively stable appearance, the transient noise probability is smoothed. Exemplary, if the probability that the second audio frame signal is transient noise is greater than the probability that the first audio frame signal is transient noise, then a first smoothing probability is obtained according to the probability that the second audio frame signal is transient noise and the probability that the first audio frame signal is transient noise. The probability that the first audio frame signal is transient noise is expresses as res(n). $D_s(n)$ is a defined variable for recording the probability that the first audio frame signal is transient noise. The probability that the second audio frame signal (which is a previous audio frame signal of the first audio frame signal) is transient noise is $D_s(n-1)$, and the smoothing probability is:

$$D_s(n) = \begin{cases} res(n), & D_s(n) \le res(n) \\ \alpha_d \times D_s(n-1) + (1-\alpha_d) \times res(n), & D_s(n) > res(n) \end{cases} \quad \text{Formula 7}$$

When n=0, $D_s(0)=0$. The transient noise probability $D_s(n)$ is used as the first smoothing probability.

Optionally, the audio frame signal is a signal obtained after framing of an original audio signal. In one possible implementation, first preset threshold high-frequency components in the original audio signal with a preset length are compensated, to obtain the first audio signal. Specifically, in the process of lip pronunciation or microphone recording, the speech signal loses high-frequency components, and with the increase of signal rate, the signal is greatly damaged in the transmission process. In order to get a better signal waveform at the receiver, it is necessary to compensate the damaged signal. In one possible implementation, pre-enhancement is performed on the original audio signal with the preset length. The audio intensity value of a sample is processed according to $y(n)=x(n)-ax(n-1)$, where x(n) is the audio intensity value of the first audio signal at the $n^{th}$ moment, x(n−1) is the audio intensity value of the first audio signal at the $(n-1)^{th}$ moment, and a is a pre-enhancement coefficient. Exemplary, $0.9<a<1$ and can be comprehended as the first present threshold. y(n) is the signal after pre-enhancement. The pre-enhancement can be considered as the first audio signal passes through a high-pass filter to compensate the high-frequency components, and high-frequency loss in lip pronunciation or microphone recording can be reduced.

In this implementation, the probability that the audio frame signal is transient noise is determined by counting the preset number of continuous samples of sub-wavelet decomposition signals in the wavelet packet decomposition signal corresponding to the audio frame signal and using the local microscopic characteristics of wavelet decomposition or wavelet packet decomposition, the accuracy of transient noise detection is improved.

Figure 8:
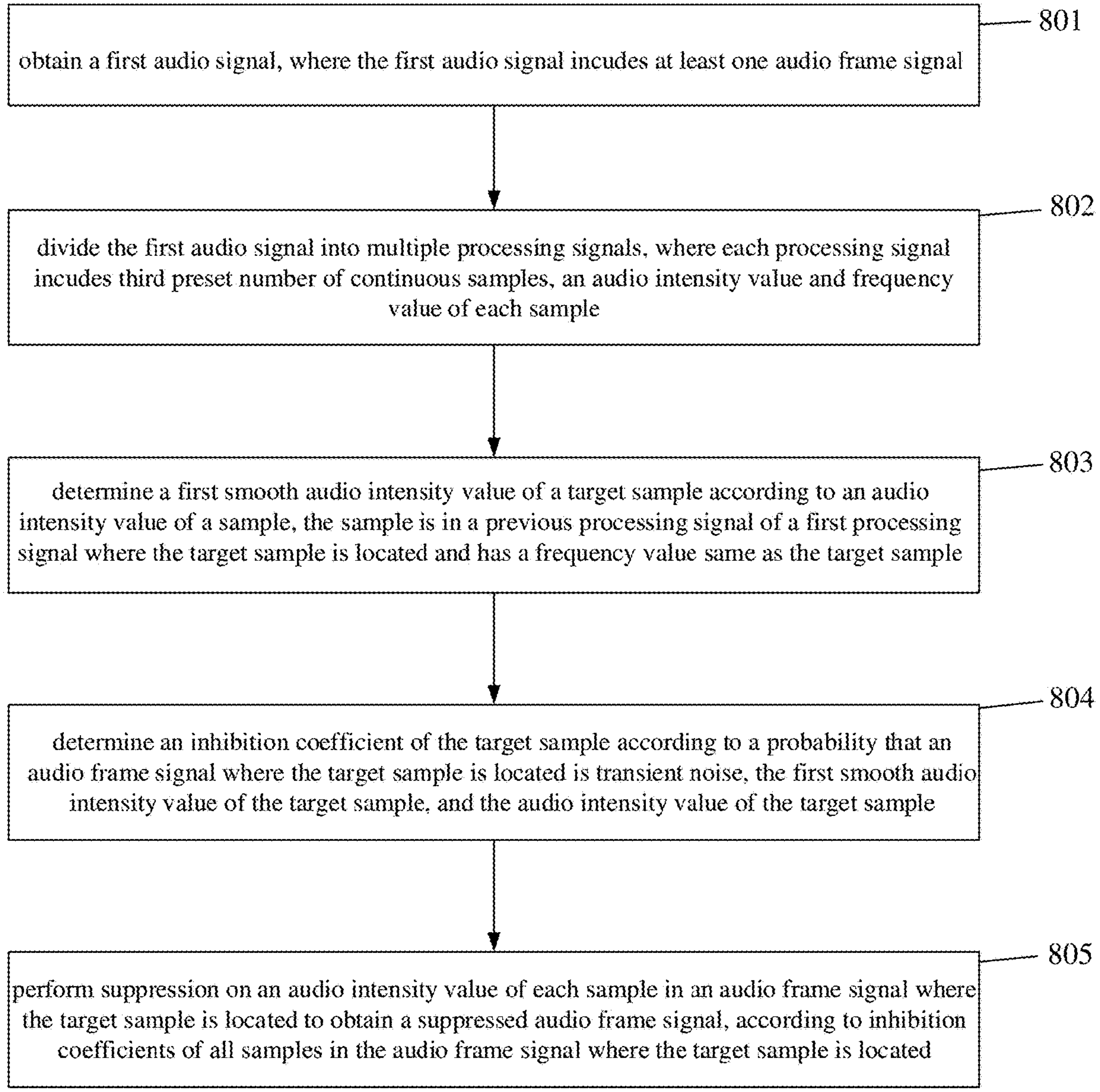
FIG. 8 is a flowchart of a method for transient noise suppression provided in implementations of the disclosure.

After determining the probability that the first audio frame signal is transient noise, the first audio frame signal is suppressed according to the probability that the first audio frame signal is transient noise. In one possible implementation, referring to FIG. 8, which is a flowchart of a method for transient noise suppression provided in implementations of the disclosure. As illustrated in FIG. 8, the first audio frame signal is suppressed as follows (801~805).

At 801, a first audio signal is obtained, where the first audio signal incudes at least one audio frame signal. The at least one audio frame signal includes the first audio frame signal. Specifically, the first audio signal is obtained by an apparatus for transient noise detection. It can be understood that, the transient noise probability determining device frames the first audio signal to obtain the first audio frame signal. Then in combination with the implementations of FIG. 1 to FIG. 7, wavelet decomposition and wavelet packet decomposition is performed on the first audio frame signal to determine the probability that the first audio frame signal is transient noise.

At 802, the first audio signal is divided into multiple processing signals, where each processing signal incudes third preset number of continuous samples, an audio intensity value and frequency value of each sample. The first audio signal includes multiple audio frame signals. Specifically, to obtain the result of noise suppression smoothly, short time Fourier Transform is performed on the first audio signal. Exemplary, the first audio signal is framed and a window function is applied. The "framing" here plays the same role as the "framing" described above, which is to divide the first audio signal into segments for processing. In the foregoing, the signal is wavelet decomposed, while here, the window signal is applied to the signal. Optionally, the frame length for framing of the first audio signal is 16 ms and the frame shift is 10 ms. It can be understood that, there is overlap between frames. Optionally, the window function can be a Hamming window expresses as:

$$w(i) = 0.54 - 0.46\cos\left(\frac{2\pi i}{N-1}\right),\ 0 \le i \le N-1 \qquad \text{Formula 8}$$

Where i represent a sample index of the first audio signal, N represents the window length of the Hamming window. Optionally, N=512. The signal after the window function is applied can be expressed as:

$$y_n(i) = y(Ln+i) \times w(i) \qquad \text{Formula 9}$$

Where n represents a frame index, $y_n(i)$ represents an audio intensity value of the $i^{th}$ sample of the $n^{th}$ frame and is a representation in time domain, i represents a sample index of the first audio signal, L represents the number of samples included in the time period of frame shift. Optionally, for example, the sampling frequency of the first audio signal is 32 kHz, and L=320.

Fourier transform is performed on the signal $y_n(i)$ after windowing, and the result is:

$$Y(n, k) = \sum_{i=0}^{N-1} y_n(i) e^{-j\frac{2\pi}{N}ik} \qquad \text{Formula 10}$$

Where n represents a frame index, k represents a frequency, j represents an imaginary part in a Fourier transform formula, i represents a sample index of the first audio signal, N represents the window length of the Hamming window and can be comprehended as the third present number. A complex sequence obtained by Fourier transform is norm modeled to obtain the amplitude of the sample with frequency of k in the $n^{th}$ frame, which is expressed as $Y_a(n, k) = \|Y(n, k)\|$. The amplitude can be comprehended as the audio intensity value of the sample. Exponential average is performed on the amplitude spectrum $Y_a(n, k)$ to obtain $Y_s(n, k)$ as the processing signal.

It can be understood that the processing signal contains multiple continuous samples as well as the audio intensity value and frequency value of each sample. $Y_s(n, k)$ represents the audio intensity value of the sample with frequency of k in the $n^{th}$ frame.

At 803, a first smooth audio intensity value of a target sample is determined according to an audio intensity value of a sample, the sample is in a previous processing signal of a first processing signal where the target sample is located and has a frequency value same as the target sample, and an audio intensity value of the target sample. Specifically, an audio intensity value $Y_a(n, k)$ of the target sample is obtained in step 802, the target sample has a frequency k, a first processing signal where the target sample is located is expressed as $Y_s(n, k)$, an audio intensity value of a processing signal prior to the first processing signal is $Y_s(n-1, k)$, a first smooth audio intensity value of the target sample is determined as $(1-\alpha_a) \times Y_s(n-1, k) + \alpha_a \times Y_a(n, k)$, the first smooth intensity value is determined as the audio intensity value of the target sample at the first processing signal and is expressed as $Y_s(n, k) = (1-\alpha_a) \times Y_s(n-1, k) + \alpha_a \times Y_a(n, k)$. The first processing signal is determined according to first smooth audio intensity values of all samples in the first processing signal. Such smoothing can be comprehended as the exponential average mentioned in step 802. Optionally, $\alpha_a$ ranges from 0 to 1, exemplary, $\alpha_a = 0.5$.

At 804, an inhibition coefficient of the target sample is determined according to a probability that an audio frame signal where the target sample is located is transient noise, the first smooth audio intensity value of the target sample, and the audio intensity value of the target sample. Specifically, in combination with implementations described with reference to FIG. 1 to FIG. 7, the probability that the audio frame signal where the target sample is located is transient noise is res(n), the first smooth intensity value of the target sample is determined as $Y_s(n, k)$ in step 803, the audio intensity value corresponding to the target sample is determined as $Y_a(n, k)$ in step 802. Exemplary, the inhibition coefficient of the target sample is determined as:

$$G(n, k) = \begin{cases} 1 - \left(1 - \dfrac{Y_s(n, k)}{Y_a(n, k)} \times res(n), & Y_a(n, k) > Y_s(n, k) \text{ and } Y_a(n, k) > 0 \\ 1, & Y_a(n, k) \le Y_s(n, k) \text{ or } Y_a(n, k) \le 0 \end{cases} \qquad \text{Formula 11}$$

It should be noted that, res(n) represents the probability that the audio frame is transient noise. The first smoothing intensity value $Y_s(n, k)$ and the audio intensity value $Y_a(n, k)$ are in one-to-one correspondence with samples in an audio frame signal. One audio frame signal may include multiple samples, and each sample includes the first smoothing intensity value $Y_s(n, k)$ and the audio intensity value $Y_a(n, k)$. The value of the probability res(n) that the audio frame is transient noise is in one-to-multiple correspondence with the first smoothing intensity value $Y_s(n, k)$ and the audio intensity value $Y_a(n, k)$.

In one possible implementation, if the device for transient noise detection smooths the probability of transient noise, according to Formula 7, the smoothed probability that the target sample is transient noise is $D_s(n)$. res(n) in Formula 11 is replaced with $D_s(n)$, and the inhibition coefficient of the target sample is expressed as:

$$G(n, k) \begin{cases} = 1 - \left(1 - \dfrac{Y_s(n, k)}{Y_a(n, k)} \times D_s(n), & Y_a(n, k) > Y_s(n, k) \text{且} Y_a(n, k) > 0 \\ 1, & Y_a(n, k) \le Y_s(n, k) \text{或} Y_a(n, k) \le 0 \end{cases} \qquad \text{Formula 12}$$

At 805, suppression is performed on an audio intensity value of each sample in an audio frame signal where the target sample is located to obtain a suppressed audio frame signal, according to inhibition coefficients of all samples in the audio frame signal where the target sample is located. Specifically, the inhibition coefficient of the target sample is determined in step 804. Formula 11 can be comprehended as determining the inhibition coefficient according to a deviation degree of an audio intensity value of samples of the same frequency relative to an audio intensity value of a processing signal prior to the processing signal where the target sample is located. When the target sample has a signal amplitude, that is, $Y_a(n, k)>0$, the audio intensity value of the target sample is greater than the audio intensity value of the target sample in the processing signal, that is, $Y_a(n, k)>Y_s(n, k)$, suppression is performed on the result Y(n, k) of the Fourier transform in step 802. Otherwise, in other situations, when $Y_a(n, k)>Y_s(n, k)$ or $Y_a(n, k)>0$ is not satisfied, no suppression will be performed on the result Y(n, k) of the Fourier transform, and the result is multiplied with 1 to maintain the original amplitude value of the target sample. Therefore, the suppressed audio signal is $Z(n, k)=Y(n, k)\times G(n, k)$, which is a frequency-domain expression. In order to obtain audio information in time domain, Fourier transform needs to be performed on the suppressed audio signal, to obtain a time domain signal expressed as:

$$z(n, i) = \frac{1}{N}\sum_{k=0}^{N-1} Z(n, k)e^{j\frac{2\pi}{N}ik} \quad \text{Formula 13}$$

z(n, i) represents the audio intensity value of the $i^{th}$ sample in the $n^{th}$ frame signal. A window function of Hamming window is applied to the first audio signal in step 802, optionally, suppressed signal can be inversely transformed by Hamming window, to output signal $z(Ln+i)=z(n, i)\times w_{inv}(i)$ as an audio signal subjected to suppression in time domain. L represents the number of samples includes in a time period of frame shift. For example, the sampling frequency of the first audio frame signal is 32 kHz, L=320. $w_{inv}(i)$ is an inverse transform representation of Hamming window w(i), which can be compared with Fourier transform and inverse Fourier transform.

In one possible implementation, first preset threshold high-frequency components in the original audio signal with a preset length are compensated, to obtain the first audio signal. Specifically, in the process of lip pronunciation or microphone recording, the speech signal loses high-frequency components, and with the increase of signal rate, the signal is greatly damaged in the transmission process. In order to get a better signal waveform at the receiver, it is necessary to compensate the damaged signal. In one possible implementation, pre-enhancement is performed on the original audio signal with the preset length. The audio intensity value of a sample is processed according to $y(n)=x(n)-ax(n-1)$, where x(n) is the audio intensity value of the first audio signal at the $n^{th}$ moment, $x(n-1)$ is the audio intensity value of the first audio signal at the $(n-1)^{th}$ moment, and a is a pre-enhancement coefficient. Exemplary, $0.9<a<1$ and can be comprehended as the first present threshold. y(n) is the signal after pre-enhancement. The pre-enhancement can be considered as the first audio signal passes through a high-pass filter to compensate the high-frequency components, and high-frequency loss in lip pronunciation or microphone recording can be reduced.

In this implementation, the inhibition coefficient of transient noise is determined according to the probability of transient noise. The implementations described above with reference to FIG. 1 to FIG. 7 improve the accuracy of transient noise detection. In addition to accurate determination of the probability of transient noise, in this implementation, smoothing is performed on audio intensity values of all samples of the signal frame in spectral domain, inhibition coefficient of transient noise is determined accurately, and effective suppression on transient noise is achieved.

Figure 9:
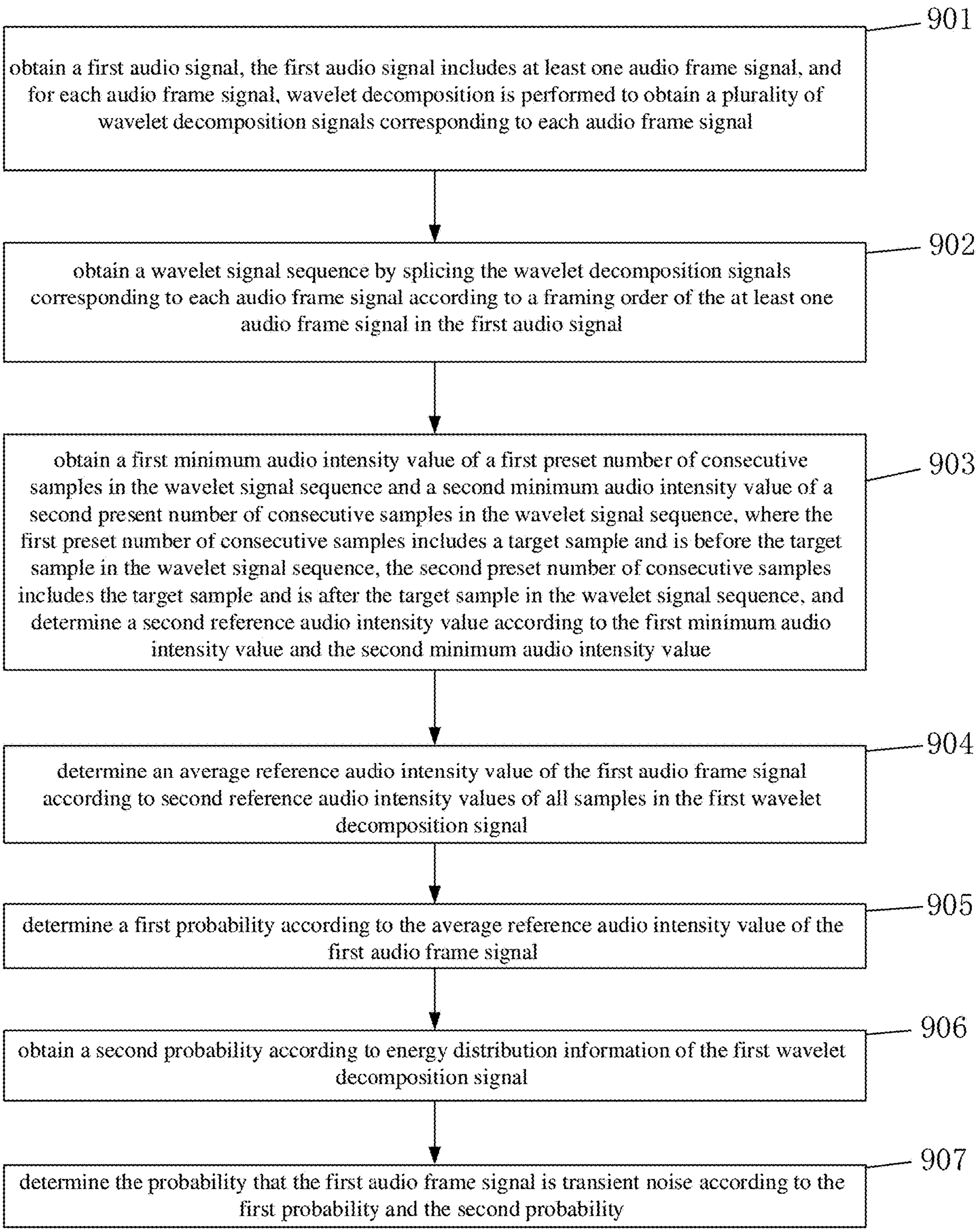
FIG. 9 is a schematic flowchart of another method for transient noise detection provided in implementations of the disclosure.

FIG. 9 is a schematic flowchart of another method for transient noise detection provided in implementations of the disclosure. Referring to FIG. 9, which is a schematic flowchart of another method for transient noise detection provided in implementations of the disclosure. As illustrated in FIG. 9, the method is executed as follows (901~907).

At 901, a first audio signal is obtained. The first audio signal includes at least one audio frame signal, for each audio frame signal, wavelet decomposition is performed to obtain a plurality of wavelet decomposition signals corresponding to each audio frame signal. Specifically, an apparatus for transient noise detection obtains the first audio signal with a preset length, and performs framing on the first audio signal to obtain the audio frame signal.

At 902, a wavelet signal sequence is obtained by splicing the wavelet decomposition signals corresponding to each audio frame signal according to a framing order of the at least one audio frame signal in the first audio signal.

It should be noted that, for details of wavelet decomposition on audio frame signals and obtaining the wavelet signal sequence by splicing the wavelet decomposition signals, reference can be made to the implementations described above with reference to FIG. 1 to FIG. 7, which will not be repeated herein.

At 903, a first minimum audio intensity value of a first preset number of consecutive samples in the wavelet signal sequence and a second minimum audio intensity value of a second present number of consecutive samples in the wavelet signal sequence are obtained, where the first preset number of consecutive samples includes a target sample and is before the target sample in the wavelet signal sequence, the second preset number of consecutive samples includes the target sample and is after the target sample in the wavelet signal sequence, and determine a second reference audio intensity value according to the first minimum audio intensity value and the second minimum audio intensity value. Specifically, to avoid misjudging the sender of a voice signal as transient noise, in addition to determining the probability that the current frame signal is transient noise in implementations described with reference to FIG. 1 to FIG. 7, the apparatus for transient noise detection further tracks and observes a voice signal for a stable duration.

Exemplary, the duration of the signal to be tracked can be set in advance. It can be understood that, a duration of a forward tracking signal includes first preset number consecutive samples, and a duration of a backward tracking signal includes second preset number consecutive samples. Optionally, the first preset number is the same as the second preset number. In the wavelet signal sequence, all samples before the target sample are divided into tracking signals each with a preset duration, a minimum audio intensity value of all samples in a first duration is recorded and passed to the tracking signal in the next preset duration, the minimum audio intensity value passed from the previous preset duration is compared with an audio intensity value of a first sample in this preset duration, and the smaller of these two intensity values are recorded and compared with an audio intensity value of the next sample of the first sample, and so on. Each time the smaller of audio intensity values is recorded and compared with the audio intensity value of the next sample, to obtain a first minimum audio intensity value of the first preset number consecutive samples. Similarly, in the wavelet signal sequence, second preset number consecutive samples after the target sample are recorded and divided into tracking signals each with a preset duration. The operations for obtain the first minimum audio intensity value are performed. A minimum audio intensity value of all samples in a first duration is recorded and passed to the tracking signal in the next preset duration, the minimum audio intensity value passed from the previous preset duration is compared with an audio intensity value of a first sample in this preset duration, and the smaller of these two intensity values are recorded and compared with an audio intensity value of the next sample in this duration, and so on. Each time the smaller of audio intensity values is recorded and compared with the audio intensity value of the next sample, to obtain a second minimum audio intensity value of the second preset number consecutive samples. The larger of the first minimum audio intensity value and the second minimum audio intensity value is determined as the second reference audio intensity value of the target sample. Implementation of forward tracking voice signal and backward tracking voice signal will be described below with reference to the accompanying drawings.

At 904, an average reference audio intensity value of the first audio frame signal is determined according to second reference audio intensity values of all samples in the first wavelet decomposition signal. Specifically, the second reference audio intensity value of the target sample is determined in step 903, and the average of second reference audio intensity values of all samples in the first wavelet decomposition signal is calculated, to obtain the average reference audio intensity value of the first audio frame signal.

At 905, a first probability is determined according to the average reference audio intensity value of the first audio frame signal. Specifically, the average reference audio intensity value of the first audio frame signal is determined in step 904. Optionally, the first probability is:

$$p_s(n) = \frac{1}{1 + e^{thr_g(thr_s - s_c(n))}} \quad \text{Formula 14}$$

$thr_g$ represents the second preset threshold, $thr_s$ represents the third preset threshold, n represents a frame index and indicates the $n^{th}$ audio frame signal, $S_c(n)$ represents the average reference audio intensity value of the $n^{th}$ audio frame signal. Exemplary, $thr_g=2000$, $thr_s=0.02$. It can be understood that the first probability is the probability that the first audio frame signal is voice signal. The sum of the probability that the first audio frame signal is voice signal and the probability that the first audio frame signal is transient signal is 1.

At 906, a second probability is obtained according to energy distribution information of the first wavelet decomposition signal. Specifically, the second probability is a probability that the first audio frame signal is transient noise. The second probability is determined to be res(n) through the step 104 described above with reference to FIG. 1 to FIG. 7, for implementation thereof, reference can be made to the forgoing implementations and will not be repeated herein.

At 907, the probability that the first audio frame signal is transient noise is determined according to the first probability and the second probability. Specifically, the first probability represents that a probability that the first audio frame signal is a voice signal is $p_s(n)$, and the second probability represents that a probability that the first audio frame signal is a transient noise is $y_{detect}=res(n)\times(1-p_s(n))$.

In one possible implementation, to reduce influence of burr between audio frame signals, the frame signals are smoothed. Optionally, an apparatus for transient noise detection divides the wavelet signal sequence into multiple signals to-be-smoothed, where each signal to-be-smoothed includes four preset number of consecutive samples and an audio intensity value of each sample. Each signal to-be-smoothed corresponds to one smoothing function. A time width of a definition domain of the smoothing function is not greater than a time width of the signal to-be-smoothed, a maximum value of a first smoothing function in the smoothing functions is located at a center of a definition domain of the first smoothing function. The signal to-be-smoothed can be comprehended as framing, the frame signal herein is movable and changes as the smoothing function moves. It can be understood that, the smoothing function has a definition domain, smoothing of all samples that having signals to-be-smoothed in the wavelet signal sequence can be achieved by moving the smoothing function. Exemplary, the smoothing function is:

$$sb(m) = \begin{cases} m+1, & 0 \le m < B \\ M-m, & B < m < M \end{cases} \quad \text{Formula 15}$$

M=2B+1, M is an odd number, the smoothing function sb(m) has the maximum function value at the center point m=B. Optionally, B=3 and represents 30 ms. According to Formula 15, the definition domain of the smoothing function is 0~M.

An average of audio intensity values of all samples in the first signal to-be-smoothed is used as a first average reference audio intensity value of all samples in the first smoothing signal. Specifically, $S_m(i)$ represents a second reference audio intensity value of the $i^{th}$ sample in the wavelet signal sequence, and is used for calculating an average of all second reference audio intensity values of all samples in the first signal to-be-smoothed. The first average reference audio intensity value of all samples in the first signal to-be-smoothed is represented as:

$$S_{frm}(n) = \frac{1}{N}\sum_{i=(n-1)N+1}^{nN} S_m(i) \quad \text{Formula 16}$$

n represents a frame index and indicates the $n^{th}$ audio frame signal, N represents the number of samples in the sub-wavelet decomposition signal.

Convolution operation is performed on the first average reference audio intensity value of all samples of signals to-be-smoothed in the wavelet signal sequence and corresponding smoothing function values, and the result of the convolution operation (convolutional result) is used as an average reference audio intensity value of the first audio frame signal. The smoothing function value is obtained according to the smoothing function and the time of a corresponding sample. Specifically, the independent variable of the smoothing function is m, the dependent variable is sb(m), the first average reference audio intensity value is represented as $S_{frm}(n)$, and the first average reference audio intensity value of a sample which has the maximum value at the center point of the smoothing function is represented as $S_{frm}(n-m)$. Exemplary, the average reference audio intensity value of the first audio frame signal is $S_c(n)=\Sigma_{m=0}^{M-1}sb(m)\cdot S_{frm}(n-m)$.

In one possible implementation, time domain amplitude smoothing is performed on the samples in the wavelet sequence, to achieve smooth transition between adjacent samples of a voice signal and reduce the influence of burr on the voice signal. In one possible implementation, the apparatus for transient noise detection multiples an audio intensity value of a previous sample of the target sample in the wavelet signal sequence by a smoothing coefficient to obtain a third reference audio intensity of the target sample. Specifically, S(i−1) represents an audio intensity value of the previous sample of the target sample, and $\alpha_s$ represents the smoothing coefficient. The audio intensity value S(i−1) of the previous sample of the target sample in the wavelet signal sequence is multiplied with the smoothing coefficient $\alpha_s$ to obtain a third reference audio intensity of the target sample, which is $\alpha_s \times S(i-1)$.

The remaining smoothing coefficient is multiplied with an average of audio intensity values of all consecutive samples in the wavelet signal sequence which includes the target sample and prior to the target sample in the wavelet signal sequence, to obtain a fourth reference audio intensity value of the target sample. Specifically, the third reference audio intensity value is part of the time-domain smoothing result, and the result obtained as follows is another part of the time-domain smoothing result: the remaining smoothing coefficient is multiplied with the average of audio intensity values of all consecutive samples in the wavelet signal sequence, where the consecutive samples include the target sample and prior to the target sample in the wavelet signal sequence. Exemplary, 3-level packet decomposition is performed on the first audio signal, and the wavelet signal sequence includes eight wavelet packet decomposition signals, in this case, the average M(i) of audio intensity values of all consecutive samples prior to the target sample is:

$$M(i)=\tfrac{1}{8}\Sigma_{l=1}^{8}x_l(i) \quad \text{Formula 17}$$

In Formula 17, i represents the $i^{th}$ sample in the wavelet signal sequence, l represents the $l^{th}$ sub-wavelet decomposition signal. It can be understood that, i is less than the total number of all samples in the wavelet signal sequence. The remaining smoothing coefficient $1-\alpha_s$ is multiplied with the average M(i) of audio intensity values of all consecutive samples in the wavelet signal sequence which includes the target sample and prior to the target sample in the wavelet signal sequence, to obtain a fourth reference audio intensity value of the target sample, and the fourth reference audio intensity value is $M(i)\times(1-\alpha_s)$.

The third reference audio intensity value is added with the fourth reference audio intensity value, the result thus obtained is used as the audio intensity value of the target sample. Specifically, the third reference audio intensity value is $\alpha_s \times S(i-1)$ and the fourth reference audio intensity value is $M(i)\times(1-\alpha_s)$, the audio intensity value of the target sample is obtained by adding the third reference audio intensity value and the fourth reference audio intensity value: $S(i)=\alpha_s \times S(i-1)+M(i)\times(1-\alpha_s)$.

In one possible implementation, a probability that the first audio frame signal is transient noise and a probability that the second audio frame signal is transient noise are obtained, the second audio frame signal is the previous audio frame signal of the first audio frame signal. A first smoothing probability is obtained according to the probability that the first audio frame signal is transient noise and the probability that the second audio frame signal is transient noise, and the first smoothing probability is used as the probability that the probability that the first audio frame signal is transient noise. Specifically, to reduce the burr effect of transient noise probability distribution and ensure that detected transient noise has relatively stable appearance, the transient noise probability is smoothed. Exemplary, if the probability that the second audio frame signal is transient noise is greater than the probability that the first audio frame signal is transient noise, then a first smoothing probability is obtained according to the probability that the second audio frame signal is transient noise and the probability that the first audio frame signal is transient noise. The probability that the first audio frame signal is transient noise is expresses as $y_{detect}(n)$. $D_s(n)$ is a defined variable for recording the probability that the first audio frame signal is transient noise. The probability that the second audio frame signal (which is a previous audio frame signal of the first audio frame signal) is transient noise is $D_s(n-1)$, and the smoothing probability is:

$$D_s(n)=\begin{cases} y_{detect}(n), & D_s(n)\le res(n) \\ \alpha_d \times D_s(n-1)+(1-\alpha_d)\times y_{detect}(n), & D_s(n)>res(n) \end{cases} \quad \text{Formula 18}$$

When n=0, $D_s(0)=0$, the probability $D_s(n)$ of the transient noise is the first smoothing probability.

In one possible implementation, the transient noise can be detected as follows: a first average of audio intensity values of all samples in a first sub-wavelet decomposition signal and a second average of audio intensity values of all samples in a second sub-wavelet decomposition signal, and the probability that the first audio frame signal is transient noise is determined according a ratio between the first average and the second average. Specifically, the first sub-wavelet decomposition signal and the second sub-wavelet decomposition signal correspond to different frequency bands of the audio frame signal, the main frequency band of human voice signal however mainly falls into the range of 300 Hz to 3400 Hz. Exemplary, the first sub-wavelet decomposition signal corresponds to a frequency band of 0~2 kHz, and the second sub-wavelet decomposition signal corresponds to a frequency band of 2~4 kHz. A ratio between the average of audio intensity values of all samples in the first sub-wavelet decomposition signal and the average of audio intensity values of all samples in the second sub-wavelet decomposition signal is determined, and the probability that the first audio frame signal is transient noise is determined according to the ratio of the first sub-wavelet decomposition signal and the second sub-wavelet decomposition signal. In one possible implementation, the wavelet decomposition signal corresponding to the audio frame signal includes multiple sub-wavelet decomposition signals. Optionally, ratios between any two sub-wavelet decomposition signals among all sub-wavelet decomposition signals in the wavelet decomposition signal is obtained, and the probability that the audio frame signal is transient noise is determined according to an average of the ratios.

In one possible implementation, first preset threshold high-frequency components in the original audio signal with a preset length are compensated, to obtain the first audio signal. Specifically, in the process of lip pronunciation or microphone recording, the speech signal loses high-frequency components, and with the increase of signal rate, the signal is greatly damaged in the transmission process. In order to get a better signal waveform at the receiver, it is necessary to compensate the damaged signal. In one possible implementation, pre-enhancement is performed on the original audio signal with the preset length according to $y(n)=x(n)-ax(n-1)$, where x(n) is the audio intensity value of the first audio signal at the $n^{th}$ moment, x(n−1) is the audio intensity value of the first audio signal at the $(n-1)^{th}$ moment, and a is a pre-enhancement coefficient. Exemplary, $0.9<a<1$ and can be comprehended as the first present threshold. y(n) is the signal after pre-enhancement. The pre-enhancement can be considered as the first audio signal passes through a high-pass filter to compensate the high-frequency components, and high-frequency loss in lip pronunciation or microphone recording can be reduced.

In this implementation, the probability of a voice signal is determined by forward tracking and backward tracking of distribution of audio intensity values of the voice signal with a preset duration, and the probability that the audio frame signal is transient noise is determined according to the probability that the audio frame signal is a voice signal and the probability that the audio frame signal is transient noise, as such, it is possible to avoid the false detection of the initial position of voice signal as transient noise, and further improve the accuracy of transient noise probability.

In one possible implementation, after determining the probability that the first audio frame signal is transient noise, the first audio frame signal is suppressed according to the probability that the first audio frame signal is transient noise. In one possible implementation, the first audio frame signal can be suppressed in combination with the implementation described with reference to FIG. 8 as follows: a first audio signal is obtained, where the first audio signal incudes at least one audio frame signal; the first audio signal is divided into multiple processing signals, where each processing signal incudes third preset number of continuous samples, an audio intensity value and frequency value of each sample, and the first audio signal includes multiple audio frame signals; a first smooth audio intensity value of a target sample is determined according to an audio intensity value of a sample, the sample is in a previous processing signal of a first processing signal where the target sample is located and has a frequency value same as the target sample, and an audio intensity value of the target sample; a first smooth audio intensity value of a target sample is determined according to an audio intensity value of a sample, the sample is in a previous processing signal of a first processing signal where the target sample is located and has a frequency value same as the target sample, and an audio intensity value of the target sample.

Specifically, the probability $y_{detect}(n)$ that the audio frame signal where the target sample is located is transient noise is determined through the implementation of FIG. 9, the res(n) in Formula 11 is replaced with the transient noise probability $y_{detect}(n)$ determined according to the voice signal probability and the transient noise probability. The inhibition coefficient is expressed as Formula 19:

Formula 19

$$G(n, k) = \begin{cases} 1-\left(1-\dfrac{Y_s(n, k)}{Y_a(n, k)}\right)\times y_{detect}(n), & Y_a(n, k) > Y_s(n, k) \text{ and } Y_a(n, k) > 0 \\ 1, & Y_a(n, k) \le Y_s(n, k) \text{ or } Y_a(n, k) \le 0 \end{cases}$$

In one possible implementation, if the apparatus for transient noise detection performs smoothing on the transient noise probability, the smoothing probability $D_s(n)$ that the target sample is transient noise is determined according to Formula 18, and the inhibition coefficient G(n, k) of the target sample is determined according to Formula 12.

Suppression is performed on an audio intensity value of each sample in an audio frame signal where the target sample is located to obtain a suppressed audio frame signal, according to inhibition coefficients of all samples in the audio frame signal where the target sample is located.

It can be understood that, suppression of transient noise can be realized with reference to the implementation described with reference to FIG. 8, which will not be repeated herein.

According to this implementation, tracking and smoothing in spectral domain are performed on audio intensity values of preset number of consecutive samples prior to the target sample and preset number of consecutive samples after the target sample in the wavelet signal sequence, the probability that the audio frame signal is a voice signal is determined according to all samples in the wavelet decomposition signal corresponding to the audio frame signal, and the probability that the audio frame signal is transient noise is affected by the probability that the audio frame signal is a voice signal, which can improve the accuracy of transient noise detection.

Figure 10:
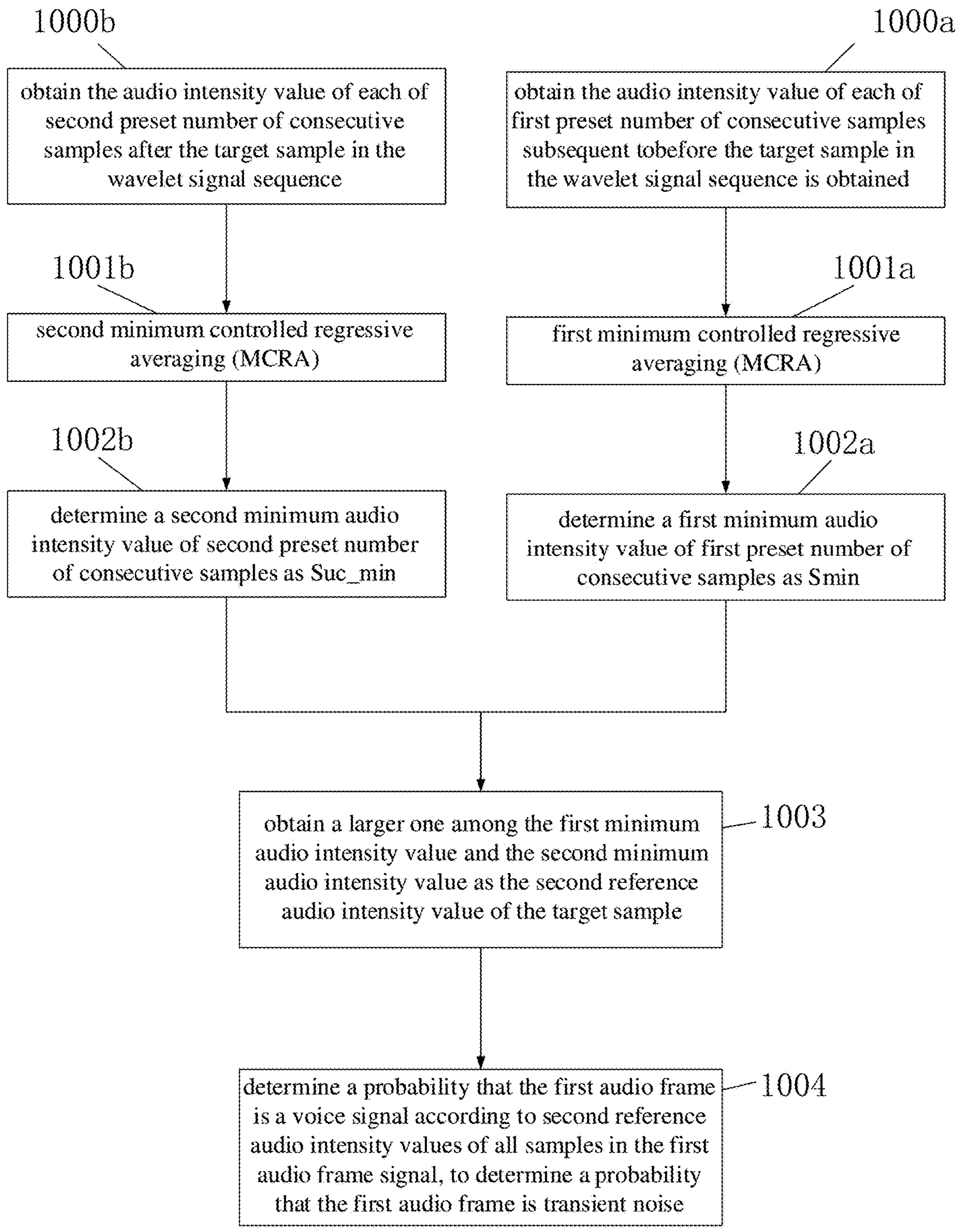
FIG. 10 is a schematic flowchart of another method for transient noise detection provided in implementations of the disclosure.
Figure 11:
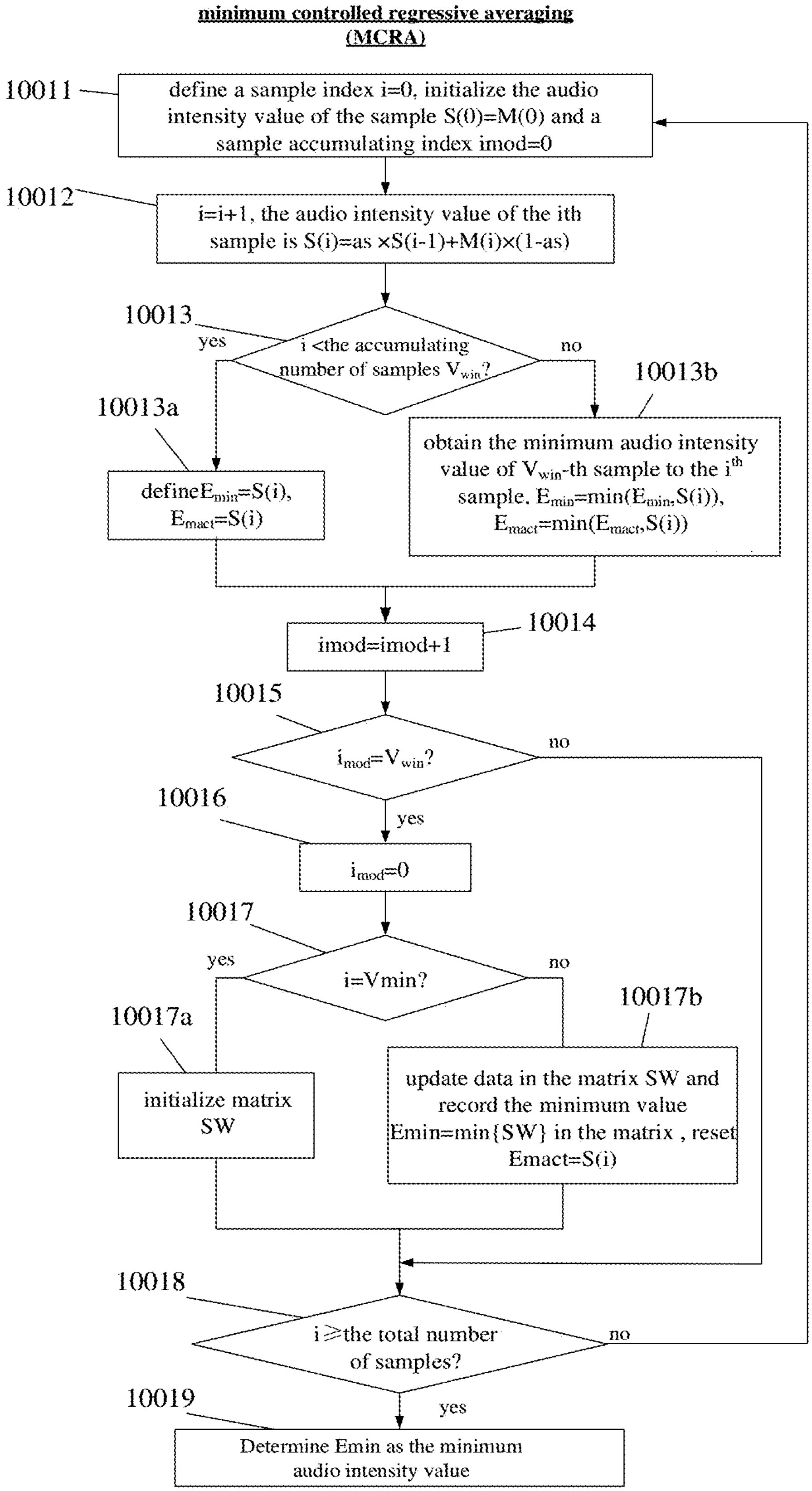
FIG. 11 is a schematic flowchart of signal energy distribution tracking provided in implementations of the disclosure.

Forward tracking and backward tracking of a voice signal will be described below with reference to the accompanying drawings. Reference is made to FIG. 10 and FIG. 11. FIG. 10 is a schematic flowchart of another method for transient noise detection provided in implementations of the disclosure. As illustrated in FIG. 10, the method is implemented as follows (1000*a*-1004).

1000*a*, the audio intensity value of each of first preset number of consecutive samples before the target sample in the wavelet signal sequence is obtained. Specifically, the audio intensity value of a sample before the target sample is obtained according to the location of the target sample in the wavelet signal sequence, and proceed to step 1001*a*.

1000*b*, the audio intensity value of each of second preset number of consecutive samples after the target sample in the wavelet signal sequence is obtained. Specifically, the audio intensity value of a sample after the target sample is obtained according to the location of the target sample in the wavelet signal sequence, and proceed to step 1001*b*.

1001*a*, perform first minimum controlled regressive averaging (MCRA). An input of the first MCRA is the audio intensity values of first preset number of samples before the target sample in the wavelet signal sequence, and the first MCRA aims to obtain the minimum value of the audio intensity values of first preset number of samples. MCRA will be introduced with reference to the drawings and reference is made to the following implementations.

1001*b*, perform second MCRA. An input of the second MCRA is the audio intensity values of second preset number of samples after the target sample in the wavelet signal sequence, and the second MCRA aims to obtain the minimum value of the audio intensity values of second preset number of samples. The first MCRA and the second MCRA can be considered as the same procedure with different inputs and outputs but with the same purpose, that is, obtaining the minimum value of audio intensity values of preset number of samples. MCRA will be introduced with reference to the drawings and reference is made to the following implementations.

1002*a*, a first minimum audio intensity value of first preset number of consecutive samples is determined as $S_{min}$. Specifically, the result of the first MCRA in step 1001*a* is determining $S_{min}$ as the first minimum audio intensity value of first preset number of consecutive samples.

1002*b*, a second minimum audio intensity value of second preset number of consecutive samples is determined as $S_{uc\_min}$. Specifically, the result of the second MCRA in step 1001*b* is determining $S_{uc\_min}$ as the second minimum audio intensity value of second preset number of consecutive samples.

1003, a larger one among the first minimum audio intensity value and the second minimum audio intensity value is obtained as the second reference audio intensity value of the target sample.

1004, a probability that the first audio frame is a voice signal is determined according to second reference audio intensity values of all samples in the first audio frame signal, to determine a probability that the first audio frame is transient noise. Specifically, reference can be made to the implementation of FIG. 9 and Formula 14, which will not be repeated herein.

MCRA will be detailed below. Reference is made to FIG. 11, which is a schematic flowchart of signal energy distribution tracking provided in implementations of the disclosure. As illustrated in FIG. 11, the method is performed as follows (10011~10019).

10011, an apparatus for transient noise detection defines a sample index i=0, initializes the audio intensity value of the sample S(0)=M(0) and a sample accumulating index $i_{mod}$=0. Specifically, i=0, S(0)=M(0), $i_{mod}$=0. It can be considered that, in an initial state of the apparatus for transient noise detection, initial values of samples to be traversed and corresponding audio intensity values are defined, and the sample accumulating index is for controlling a preset duration. As such, when the value of sample accumulating index $i_{mod}$ reaches a certain value, data will be updated and tracking of a signal with a preset duration is completed.

10012, i=i+1, the audio intensity value of the $i^{th}$ sample is $S(i)=\alpha_s \times S(i-1)+M(i)\times(1-\alpha_s)$. Specifically, audio intensity value of a sample is tracked, in other words, energy distribution is tracked, i=i+1. Amplitude smoothing is performed on each traversed sample, and the smoothed audio intensity value of the $i^{th}$ sample is $S(i)=\alpha_s \times S(i-1)+M(i)\times(1-\alpha_s)$. Optionally, $\alpha_s$=0.7.

10013, determine whether i is less than the accumulating number of samples $V_{win}$. Specifically, in this implementation, tracking is performed on a signal with a preset duration, therefore the samples need to be accumulated. The accumulating number $V_{win}$ of samples is predefined, for example, $V_{win}$=20. For the 0 to $19^{th}$ sample, the operation at step 10013*a* is performed, and when traversing the $20^{th}$ sample, the operation at step 10013*b* is performed.

10013*a*, if $i<V_{win}$, define $E_{min}$=S(i), $E_{mact}$=S(i). Specifically, traversing is performed from first sample in the wavelet signal sequence, and audio intensity smoothing is performed on samples, if $i<V_{win}$, the value of S(i) is assigned to $E_{min}$ and $E_{mact}$, that is, $E_{min}$=S(i), $E_{mact}$=S(i). Proceed to step 10014 for sample accumulating. Exemplary, i=i+1, it can be considered that the apparatus for transient noise detection keeps tracking of audio intensity values of samples, if $i<V_{win}$, it indicates the first $V_{win}$ samples in the first audio signal, for example, $V_{win}$=20. When traversed the $19^{th}$ sample, $E_{min}$=S(19), $E_{mact}$=S(19), where $E_{min}$ and $E_{mact}$ records the audio intensity value of the $19^{th}$ sample.

10013*b*, obtain the minimum audio intensity value of the $V_{win}$-th sample to the $i^{th}$ sample, $E_{min}$=min ($E_{min}$, S(i)), $E_{mact}$=min ($E_{mact}$, S(i)). Specifically, if $i \ge V_{win}$, when traversing the $V_{win}$-th sample, for example, $V_{win}$=20, exemplary, when step 10013 traversing the $20^{th}$ sample, the less one among the $19^{th}$ sample and the $20^{th}$ sample is assigned to $E_{min}$, $E_{min}$=min ($E_{min}$, S(20)), $E_{min}$ in a previous step 10013 of traversing the $20^{th}$ sample has the value of S(19) recorded.

10014, $i_{mod}=i_{mod}+1$, specifically, during traversing sample i, sample accumulation $i_{mod}$ is also accumulated, $i_{mod}=i_{mod}+1$, and $i_{mod}$ controls whether data updating is performed on matrix SW. The wavelet signal sequence is divided into voice signals each of a preset duration for tracking. It can be understood that, i represents the location and order of samples in the wavelet signal sequence, $i_{mod}$ represents the location and order of the $i^{th}$ sample in the preset duration. When reaching the preset duration, $i_{mod}$ will be reset, to restart to record the location of a sample in a next wavelet signal sequence in the next preset duration.

10015, determine whether $i_{mod}=V_{min}$. Specifically, compare $i_{mod}$ with $V_{min}$ to determine whether tracking of a sample has reached a preset duration. Exemplary, 3-level wavelet packet decomposition and down-sampling are performed with a sampling frequency of the first audio signal of 32 kHz, then sampling is performed every 0.25 ms in the wavelet signal sequence, the sample accumulating number $V_{win}$=20, the tracking duration is $V_{win}\times 0.25$=5 ms. If $i_{mod}=V_{min}$, it indicates that the tracking preset duration has been reached and proceed to step 10017*a*, if $i_{mod}\neq V_{min}$, optionally, if $i_{mod}<V_{min}$, proceed to step 10017*b*.

10016, $i_{mod}$=0. Specifically, each time $i_{mod}$ reaches the sample accumulating number $V_{win}$, $i_{mod}$ is released. Reset $i_{mod}$=0 for next sample accumulation.

10017, determine whether $i=V_{min}$. Specifically, when $i=V_{min}$, proceed to step 10017*a*, initialize matrix data; when $i\neq V_{min}$, proceed to step 10017*b*.

10017*a*, initialize matrix SW. Specifically, SW is defined as:

$$SW = \begin{bmatrix} S(V_{min}) \\ \dots\dots \\ S(V_{min}) \\ S(V_{min}) \end{bmatrix}_{N_{win}\times 1} \quad \text{Formula 20}$$

When $i=V_{min}$, define a matrix SW of Ni, rows and one column, optionally, $N_{win}$=2. It can be understood that, this step starts at the beginning of a voice, i is accumulating, $V_{win}$ is a preset fixed value, when i traverses the $V_{win}$-th sample, the matrix SW is initialized to provide a matrix to store data in this implementation.

10017*b*, data in the matrix SW is updated and the minimum value $E_{min}$=min{SW} in the matrix is recorded, reset $E_{mact}$=S(i). Specifically, SW is:

$$SW = \begin{bmatrix} S(i-(N_{win}-1)\times V_{min}) \\ \dots\dots \\ S(i-2V_{min}) \\ S(i-V_{min}) \\ E_{mact} \end{bmatrix}_{N_{win}\times 1} \quad \text{Formula 21}$$

When $i\neq V_{min}$ and $i_{mod}$ is accumulated to the preset duration, the values in the matrix SW are updated to place the minimum value of all samples in the current duration and the minimum value in the previous duration into the matrix SW, to achieve energy tracking of samples included in a preset duration before the target sample, the smaller one among the above two minimum values is obtained and recorded in $E_{min}$, where $E_{min}$=min {SW}. It can be understood that, $E_{min}$ records the minimum value of all samples starting from the previous sample of $V_{min}$, release $E_{mact}$ and reset $E_{mact}$=S(i). Exemplary, the tracking duration is 5 ms, $E_{mact}$ records the minimum value of audio intensity values of all samples in recent 5 ms, the minimum value of an adjacent 5 ms is placed in a matrix SW with a length of 2, the smaller one of these two minimum values are obtained and recorded in $E_{min}$, $E_{min}$=min {SW}. As such, in the first MCRA, $E_{min}$ represents the first minimum audio intensity value $S_{min}$ of first present number of consecutive samples.

In the second MCRA, track second preset number of consecutive samples from the target sample, one MCRA procedure is performed for each sample to obtain $E_{min}$, where $E_{min}$ represents a second minimum audio intensity value $S_{uc\_min}$ of second preset number of samples. Specifically, before sample accumulating, determine the location of the sample in the wavelet signal sequence, and determine whether there are still second preset number of consecutive points after sample i. Exemplary, the condition for determination is:

$$i<L_s-N_{nc} \qquad \text{Formula 22}$$

$L_s$ is the number of samples in the wavelet signal sequence. For example, the sampling frequency of the first audio is 32 kHz and 3-level wavelet decomposition is performed. In one second, $L_s$=4000. $N_{uc}$ represents the number of second present number of consecutive samples. Optionally, $N_{uc}$=160.

If i<$L_s$−$N_{nc}$, track second preset number of consecutive samples starting from the target sample, record the audio intensity values corresponding to second present number of consecutive samples as an independent short-time sequence, which is represented as:

$$\overrightarrow{\text{Marr}_i}=[M(i)M(i+1)\ \ldots\ M(i+N_{uc}-1)]_{1\times N_{uc}} \qquad \text{Formula 23}$$

$N_{uc}$ represents the number of the second preset number of consecutive samples. Optionally, $N_{uc}$=160. M(i) represents the audio intensity value of the $i^{th}$ sample. It can be understood that, backward track the energy distribution of $N_{uc}$ samples to obtain the second minimum audio intensity value $S_{uc\_min}$ of the second preset number of samples, which is expressed as:

$$S_{uc\_min}=\text{MCRA}(\overrightarrow{\text{Marr}_i}) \qquad \text{Formula 24}$$

Formula 24 can be understood as follows. The output $E_{min}$ of MCRA is assigned to $S_{uc\_min}$ as the second minimum audio intensity value of the second preset number of consecutive samples. As such, the second MCRA obtains the second minimum audio intensity value of the second preset number of consecutive samples after the target sample.

10018, determine whether i≥the total number of samples. Specifically, before re-tracking the signal in the preset time period in step 10011, position of a sample in the wavelet signal sequence needs to be determined, and determine whether i relating to the $i^{th}$ sample is greater than or equal to the total number of samples in the wavelet signal sequence. Since i continuous to be added by 1, and traversing of the samples is moving backward, if i is less than the total number of samples in the wavelet signal sequence, signal tracking continuous. If the $i^{th}$ sample is the last one of all samples, that is, i is equal to or greater than the total number of samples, the above procedure is ended and the signal tracking of the wavelet signal sequence is completed.

10019, determine $E_{min}$ as the minimum audio intensity value. Specifically, audio intensity values of preset number of samples are recorded in a matrix and the minimum value in the matrix is obtained and assigned to $E_{min}$, thus obtain the first minimum audio intensity value and the second minimum audio intensity value. As can be seen from step 10017*b*, during the first MCRA, the first minimum audio intensity value of the first preset number of samples before the target sample in the wavelet signal sequence is obtained according to Formula 21, the value of $E_{min}$ is $S_{min}$, during the second MCRA, according to Formula 23 and Formula 24, the value of $E_{min}$ outputted is $S_{uc\_min}$, which represents the second minimum audio intensity value of the second preset number of samples after the target sample in the wavelet signal sequence. As such, tracking of energy distribution of samples before the target sample and energy distribution of samples after the target sample is completed.

Next, in combination with steps 1003 and 1004 in the implementation of FIG. 10, the larger one of the first minimum audio intensity value $S_{min}$ and the second minimum audio intensity value $S_{uc\_min}$ is obtained as the second reference audio intensity value of the target sample. The probability that the first audio frame signal is a voice signal is determined according to second reference audio intensity values of all samples in the first audio frame signal, so as to determine the probability that the first audio frame is transient noise. Specifically, minimum value tracking is performed on samples in a duration before the target sample and samples in a duration after the target sample, then the minimum value before the target sample and the minimum value after the target sample is compared to determine the larger one as the second reference audio intensity value of the target sample, which is expressed as:

$$S_m(i)=\max\{S_{uc\_min},S_{min}\} \qquad \text{Formula 25}$$

If there is no second preset number of consecutive samples after the $i^{th}$ sample, the first minimum audio intensity value is determined as the second reference audio intensity value of the target sample. Specifically, when sample i is traversed, the number of samples after sample i is decreasing, and when the i<$L_s$−$N_{nc}$ in Formula 22 is not satisfied, the second reference audio intensity value of the target sample is:

$$S_m(i)=S_{min} \qquad \text{Formula 26}$$

The first average reference audio intensity value is determined according the second reference audio intensity value $S_m$(i) of the target sample and Formula 16, then the average reference audio intensity value of the first audio frame signal is determined. Next, the probability that the first audio frame is a voice signal is determined according to Formula 14, then the probability that the first audio frame signal is transient noise is determined according to the probability of the voice signal and the probability of the transient noise: $y_{detect}$=res (n)×(1−$p_s$(n)).

In this implementation, the minimum value $S_{min}$ of audio intensity values of all samples in the previous tracking duration is transferred to the current tracking duration through a matrix, $S_{min}$ is compared with the audio intensity value of the first sample in the current tracking duration, the smaller one of these two is further compared with the audio intensity value of a subsequent sample of the first sample, and so on. The first minimum audio intensity value of the first preset number of samples, which include the target sample and are before the target sample in the wavelet signal sequence, is obtained. In addition, the second minimum audio intensity value of the second preset number of consecutive samples after the target sample in the wavelet signal sequence is determined, and an independent short-time sequence is formed by accumulated recording of the second preset number of consecutive samples. Tracking is initiated and a matrix is used for tracking of audio intensity values of the second preset number of consecutive samples recorded in the short-time sequence, the implementation is similar to the principle of tracking the first preset number of consecutive samples spliced before the target sample in the wavelet signal sequence. The second minimum audio intensity value $S_{uc\_min}$ in the current tracking duration is transferred to the next tracking duration, $S_{uc\_min}$ is compared with the audio intensity value of the first sample in the next tracking duration, and the smaller one of these two is compared with the audio intensity value of the subsequent sample of the first sample, and so on. The second minimum audio intensity value of the second preset number of samples, which include the target sample and are after the target sample in the wavelet signal sequence, is obtained. The larger one of the first audio intensity value and the second audio intensity value is obtained as the second reference audio intensity value $S_m(i)$ of the target sample. The sample sequence composed of $S_m(i)$ can describe the distribution of audio intensity values of the voice signal, or can be comprehended as the energy distribution tendency of the voice signal. The probability that the audio frame is a voice signal can be determined according to second reference audio intensity values of all samples in the audio frame, so as to determine the probability that the audio frame is transient noise.

In this implementation, by tracking the energy distribution of a signal with a stable duration, the probability that the audio frame signal is a voice signal is detected, and the probability that the audio frame is transient noise can be determined according to the probability that the signal frame is a voice signal and the probability that the signal frame is transient noise, this avoids the false detection of the audio frame of the voice signal as transient noise, and can further improve the accuracy of transient noise detection.

Effects of the implementation will be described with reference to FIG. 12 and FIG. 13.

Figure 12:
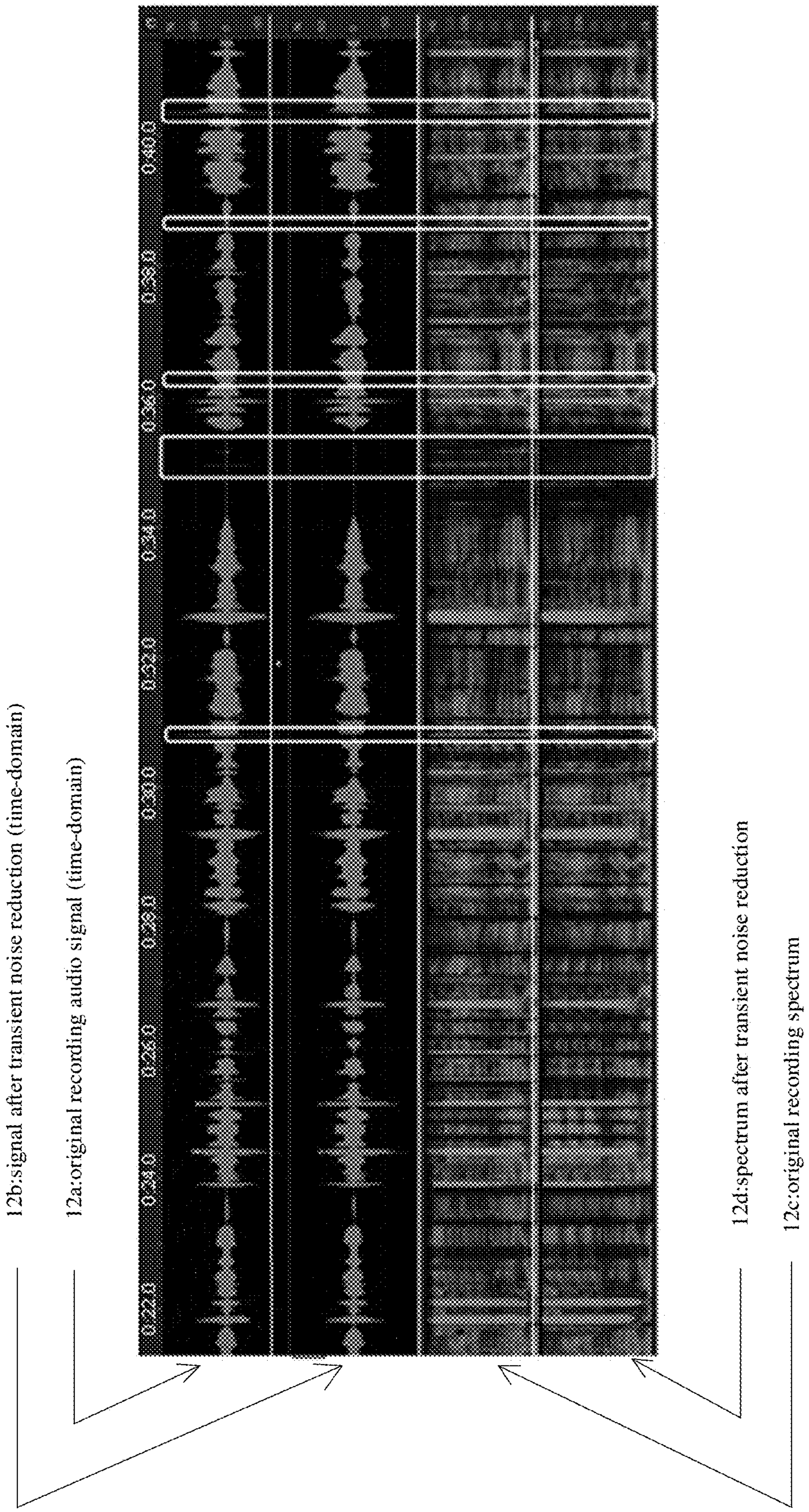
FIG. 12 is an effect diagram of transient noise detection and suppression provided in implementations of the disclosure.
Figure 13:
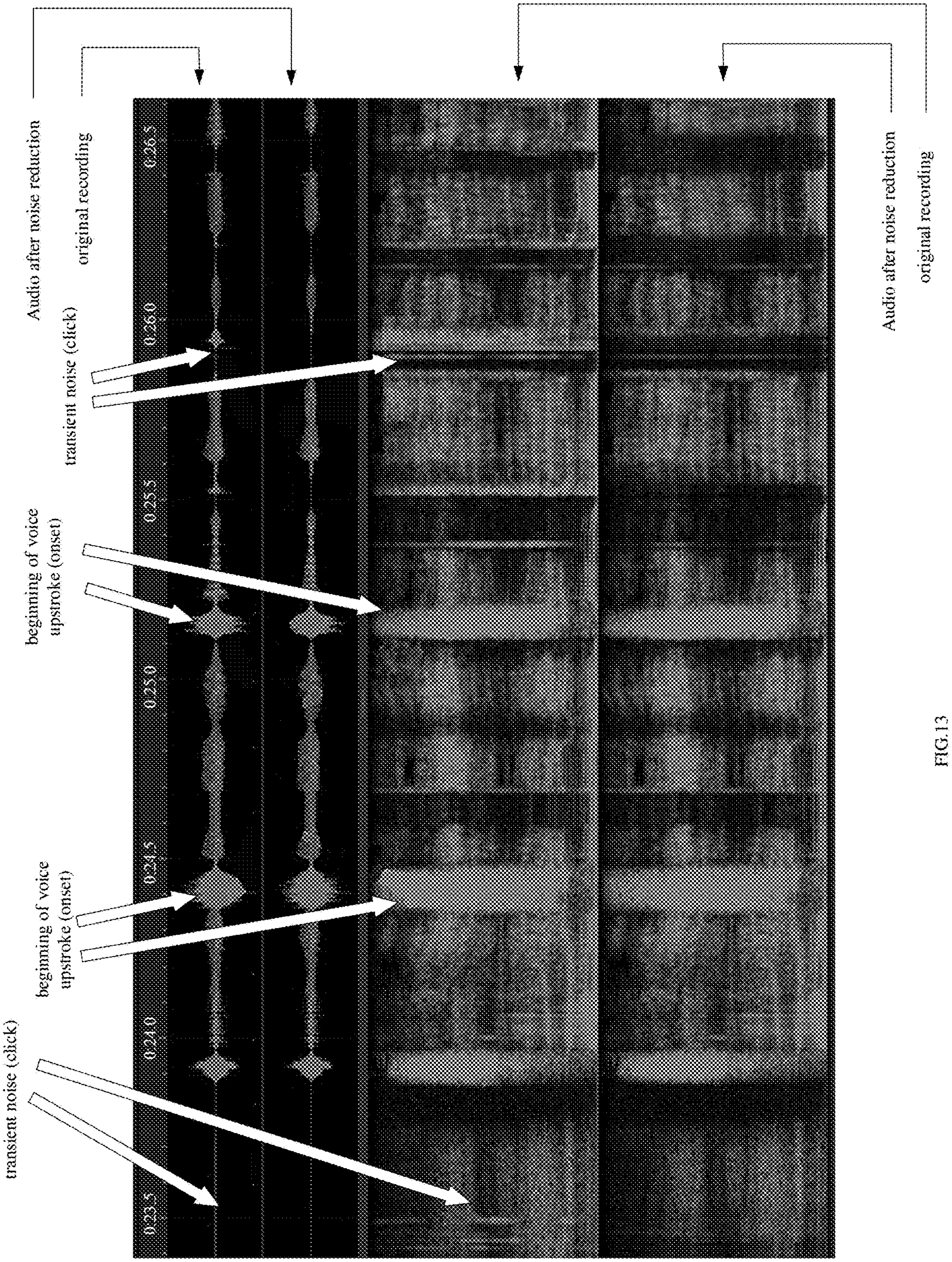
FIG. 13 is an effect diagram of transient noise detection and suppression provided in implementations of the disclosure.

Referring to FIG. 12, which is an effect diagram of transient noise detection and suppression provided in implementations of the disclosure. As illustrated in FIG. 12, 12*a* is an original recorded audio signal in time-domain, and 12*b* is transient noise-suppressed signal. In combination with the implementations of FIG. 1 to FIG. 7, the probability that a signal in 12*a* is transient noise is determined. In combination with the implementations of FIG. 8, the signals in 12*a* (especially signals in the block) are weakened to different degrees. Transient burr rise can be seen in the figure. With transient noise suppression, the transient noise in 12*a* can be effectively suppressed to the signal amplitude in the block of 12*b*. The spectrum diagram has a more delicate representation effect, and the depth of the color represents the strength of the frame signal amplitude. An original recorded frequency spectrum 12*c* is displayed in the frequency-domain corresponding to 12*a*, and the frequency domain display corresponding to 12*b* is the frequency domain display after transient-noise suppression 12*d*. As can be seen in 12*c*, there is transient noise in the block, after suppression, the amplitude of transient noise in 12*d* is weakened to the extent that will not affect the original recorded signal. FIG. 12 is a schematic diagram of the effect achieved by implementations described above in combination with FIG. 1 to FIG. 8. Referring to FIG. 13, which is another effect diagram of transient noise detection and suppression provided in implementations of the disclosure. As illustrated in FIG. 13, the transient noise and the beginning of voice upstroke onset are both characterized by a sudden increase in amplitude, for distinguishing purpose, implementations of FIG. 9 and FIG. 10 are carried out to effectively avoid the false detection of the beginning of voice upstroke onset as transient noise. The transient noise is effectively suppressed while signal characteristics at the beginning of the voice upstroke onset is maintained as much as possible.

Figure 14:
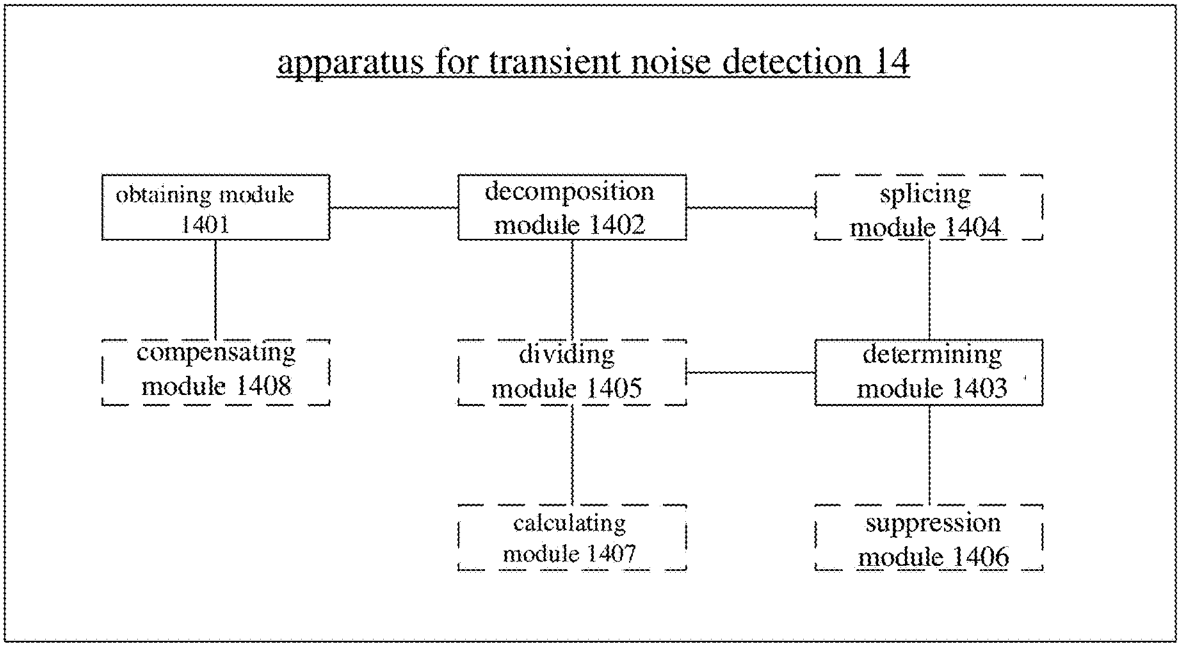
FIG. 14 is a structural block diagram of an apparatus for transient noise detection provided in implementations of the disclosure.

An apparatus for transient noise detection provided in implementations of the disclosure will be described below. Referring to FIG. 14, which is a structural block diagram of an apparatus for transient noise detection provided in implementations of the disclosure. As illustrated in FIG. 14, the apparatus for transient noise detection 14 includes an obtaining module 1401, a decomposition module 1402, and a determining module 1403.

The obtaining module 1401 is configured to obtain an audio frame signal having a preset duration, the audio frame signal includes a plurality of samples and an audio intensity value of each sample.

The decomposition module 1402 is configured to perform wavelet decomposition on a first audio frame signal to obtain a first wavelet decomposition signal corresponding to the first audio frame signal, the first wavelet decomposition signal includes a plurality of sub-wavelet decomposition signals, and each sub-wavelet decomposition signal includes a plurality of samples and an audio intensity value of each sample.

The determining module 1403 is configured to determine a first reference audio intensity value of a first sub-wavelet decomposition signal according to reference audio intensity values of all samples in the first sub-wavelet decomposition signal.

The determining module 1403 is configured to determine energy distribution information of the first wavelet decomposition signal according to first reference audio intensity values of all sub-wavelet decomposition signals in the first wavelet decomposition signal.

The determining module 1403 is configured to determine a probability that the first audio frame signal is transient noise according to the energy distribution information of the first wavelet decomposition signal.

In one possible implementation, the obtaining module 1401 is further configured to obtain a first audio signal. The first audio signal includes at least one audio frame signal, and for each audio frame signal, the obtaining module 1401 is configured to perform wavelet decomposition to obtain a plurality of wavelet decomposition signals corresponding to each audio frame signal.

The apparatus 14 further includes a splicing module 1404. The splicing module 1404 is configured to obtain a wavelet signal sequence by splicing the wavelet decomposition signals corresponding to each audio frame signal according to a framing order of the at least one audio frame signal in the first audio signal.

The obtaining module 1401 is further configured to obtain a first minimum audio intensity value of a first preset number of consecutive samples in the wavelet signal sequence and a second minimum audio intensity value of a second present number of consecutive samples in the wavelet signal sequence, where the first preset number of consecutive samples includes a target sample and is before the target sample in the wavelet signal sequence, the second preset number of consecutive samples includes the target sample and is after the target sample in the wavelet signal sequence.

The determining module 1403 is further configured to determine a second reference audio intensity value according to the first minimum audio intensity value and the second minimum audio intensity value in the obtaining module 1401, determine an average reference audio intensity value of the first audio frame signal according to second reference audio intensity values of all samples in the first wavelet decomposition signal, determine first probability according to the average reference audio intensity value of the first audio frame signal, obtain second probability according to the energy distribution information of the first wavelet decomposition signal, and determine the probability that the first audio frame signal is transient noise according to the first probability and the second probability.

In one possible implementation, the obtaining module 1401 is further configured to obtain a first audio signal. The first audio signal includes at least one audio frame signal.

The apparatus 14 further includes a dividing module 1405, which is configured to divide the first audio signal to a plurality of processing signals, where each processing signal includes a third preset number of consecutive samples, an audio intensity value of each sample, and a frequency value of each sample, where the first audio signal includes a plurality of audio frame signals.

The determining module 1403 is further configured to determine a first smooth audio intensity value of a target sample according to an audio intensity value of a sample, the sample is in a previous processing signal of a first processing signal where the target sample is located and has a frequency value same as the target sample, and an audio intensity value of the target sample.

The determining module 1403 is further configured to determine an inhibition coefficient of the target sample according to a probability that an audio frame signal where the target sample is located is transient noise, the first smooth audio intensity value of the target sample, and the audio intensity value of the target sample.

The apparatus 14 further includes a suppression module 1406, which is configured to perform suppression on an audio intensity value of each sample in an audio frame signal where the target sample is located to obtain a suppressed audio frame signal, according to inhibition coefficients of all samples in the audio frame signal where the target sample is located.

In one possible implementation, the obtaining module 1401 is further configured to obtain a probability that the first audio frame signal is transient noise and a probability that the second audio frame signal is transient noise, where the second audio frame signal is a previous audio frame signal of the first audio frame signal.

The obtaining module 1401 is further configured to obtain a first smoothing probability according to the probability that the first audio frame signal is the transient noise and the probability that the second audio frame signal is transient noise and use the first smoothing probability as the probability that the first audio frame signal is transient noise.

In one possible implementation, the dividing module 1405 is further configured to divide the wavelet signal sequence to a plurality of signals to-be-smoothed, where each signal to-be-smoothed includes a fourth preset number of consecutive samples and an audio intensity value of each sample, each signal to-be-smoothed corresponds to a smoothing function, a time width of a definition domain of the smoothing function is not greater than a time width of the signal to-be-smoothed, a maximum value of a first smoothing function in the smoothing functions is located at a center of a definition domain of the first smoothing function.

The determining module 1403 is further configured to determine an average of audio intensity values of all samples in the first signal to-be-smoothed as a first average reference audio intensity value of all samples in the first smoothing signal, and perform convolution operation on the first average reference audio intensity value of all samples in each signal to-be-smoothed in the wavelet signal sequence and a corresponding smoothing function value to obtain a convolutional result, and use the convolutional result as an average reference audio intensity value of the first audio frame signal, where the smoothing function value is obtained according to the smoothing function and a time of a corresponding sample.

Optionally, the apparatus 14 further includes a calculating module 1407, which is configured to obtain a third reference audio intensity of the target sample by multiplying an audio intensity value of a previous sample of the target sample in the wavelet signal sequence with a smoothing coefficient.

The calculating module 1407 is further configured to obtain a fourth reference audio intensity value of the target sample by multiplying a remaining smoothing coefficient with an average of audio intensity values of all consecutive samples in the wavelet signal sequence which includes the target sample and are spliced before the target sample in the wavelet signal sequence.

The calculating module 1407 is further configured to obtain the audio intensity value of the target sample by adding the third reference audio intensity value with the fourth reference audio intensity value.

In one possible implementation, the reference audio intensity value includes an average and a variance of audio intensity values of a fifth preset number of consecutive samples.

In one possible implementation, the determining module 1403 is further configured to determine the probability that the first audio frame signal is transient noise as $$res(n) = \left[\frac{1}{2}\left(\cos\left(\text{result}(n) \times \frac{\pi}{\lambda} + \pi\right) + 1\right)\right]^2$$

Where result(n) represents energy distribution information of a wavelet decomposition signal corresponding to the $n^{th}$ audio frame signal, n represents an frame index indicating the $n^{th}$ audio frame signal, λ represents a first preset threshold, if a value of result(n) is greater than the first preset threshold, the probability that the first audio frame signal is transient noise is 1.

Optionally, the determining module 1403 is further configured to determine the energy distribution information of the first wavelet decomposition signal corresponding to the first audio $$\text{result}(n) = \sum\nolimits_1^l \left[\frac{1}{N}\sum\nolimits_{i=(n-1)N+1}^{nN} \frac{\left(x_l(i) - m_l^1(i-1)\right)}{m_l^2(i-1)}\right].$$

Where l represents the number of sub-wavelet decomposition signals included in the first wavelet decomposition signal, N represents the number of samples included in each sub-wavelet decomposition signal, n represents a frame index indicating the $n^{th}$ audio frame signal, $x_l(i)$ represents an audio intensity value of the $l^{th}$ sub-wavelet decomposition signal at the $i^{th}$ sample in a wavelet decomposition signal, $m_l^1(i-1)$ represents an average of audio intensity values till the $(i-1)^{th}$ sample in the $l^{th}$ sub-wavelet decomposition signal, $m_l^2(i-1)$ represents a variance of audio intensity values till the $(i-1)^{th}$ sample in the $l^{th}$ sub-wavelet decomposition signal.

In one possible implementation, the obtaining module 1401 is further configured to: obtain a first average of audio intensity values of all samples in a first sub-wavelet decomposition signal and a second average of audio intensity values of all samples in a second sub-wavelet decomposition signal.

The determining module 1403 is configured to determine the probability that the first audio frame signal is transient noise according a ratio between the first average and the second average.

In one possible implementation, the determining module 1403 is further configured to determine the second probability as $$p_s(n) = \frac{1}{1 + e^{thr_g(thr_s - s_c(n))}},$$

where $thr_g$ represents a second preset threshold, $thr_s$ represents a third preset threshold, n represents a frame index indicating the $n^{th}$ audio frame signal, $S_c(n)$ represents an average reference audio intensity value of the $n^{th}$ audio frame signal.

Optionally, the apparatus further includes a compensating module 1408, which is configured to compensate high-frequency components of a first preset threshold in an original audio signal having the preset duration to obtain the first audio signal.

In one possible implementation, the decomposition module 1402 is further configured to perform wavelet packet decomposition on each audio frame signal and use a signal obtained through wavelet packet decomposition as the wavelet decomposition signal.

The effective voice signal detection can be implemented with reference to FIG. 1 to FIG. 13, which will not be repeated herein.

In this implementation, by counting the preset number of continuous samples in the wavelet packet decomposition signal corresponding to the audio frame signal and using the local microscopic characteristics of wavelet decomposition or wavelet packet decomposition, the accuracy of transient noise detection is improved.

Figure 15:
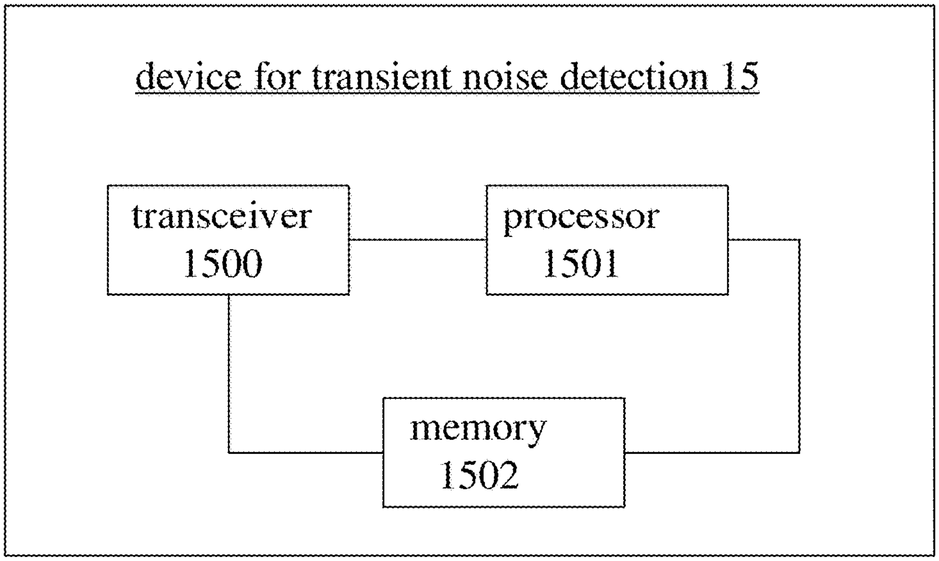
FIG. 15 is a structural block diagram of a device for transient noise detection provided in implementations of the disclosure.

A device for transient noise detection provided in implementations of the disclosure will be described below. Referring to FIG. 15, which is a structural block diagram of a device for transient noise detection provided in implementations of the disclosure. As illustrated in FIG. 15, the device for transient noise detection 15 includes a transceiver 1500, a processor 1501, and a memory 1502. The transceiver 1500 is coupled with the processor 1501 and the memory 1502. The processor 1501 is further coupled with the memory 1502.

The transceiver 1500 is configured to obtain an audio frame signal having a preset duration, the audio frame signal includes a plurality of samples and an audio intensity value of each sample.

The processor 1501 is configured to perform wavelet decomposition on a first audio frame signal to obtain a first wavelet decomposition signal corresponding to the first audio frame signal, the first wavelet decomposition signal includes a plurality of sub-wavelet decomposition signals, and each sub-wavelet decomposition signal includes a plurality of samples and an audio intensity value of each sample.

The processor 1501 is configured to determine a first reference audio intensity value of a first sub-wavelet decomposition signal according to reference audio intensity values of all samples in the first sub-wavelet decomposition signal.

The processor 1501 is configured to determine energy distribution information of the first wavelet decomposition signal according to first reference audio intensity values of all sub-wavelet decomposition signals in the first wavelet decomposition signal.

The processor 1501 is configured to determine a probability that the first audio frame signal is transient noise according to the energy distribution information of the first wavelet decomposition signal.

In one possible implementation, the transceiver 1500 is further configured to obtain a first audio signal. The first audio signal includes at least one audio frame signal, and for each audio frame signal, the transceiver 1500 is configured to perform wavelet decomposition to obtain a plurality of wavelet decomposition signals corresponding to each audio frame signal.

The processor 1501 is configured to obtain a wavelet signal sequence by splicing the wavelet decomposition signals corresponding to each audio frame signal according to a framing order of the at least one audio frame signal in the first audio signal.

The transceiver 1500 is further configured to obtain a first minimum audio intensity value of a first preset number of consecutive samples in the wavelet signal sequence and a second minimum audio intensity value of a second present number of consecutive samples in the wavelet signal sequence, where the first preset number of consecutive samples includes a target sample and is before the target sample in the wavelet signal sequence, the second preset number of consecutive samples includes the target sample and is after the target sample in the wavelet signal sequence.

The processor 1501 is further configured to determine a second reference audio intensity value according to the first minimum audio intensity value and the second minimum audio intensity value in the obtaining module 1401, determine an average reference audio intensity value of the first audio frame signal according to second reference audio intensity values of all samples in the first wavelet decomposition signal, determine first probability according to the average reference audio intensity value of the first audio frame signal, obtain second probability according to the energy distribution information of the first wavelet decomposition signal, and determine the probability that the first audio frame signal is transient noise according to the first probability and the second probability.

In one possible implementation, the transceiver 1500 is further configured to obtain a first audio signal. The first audio signal includes at least one audio frame signal.

The processor 1501 is further configured to: divide the first audio signal to a plurality of processing signals, where each processing signal includes a third preset number of consecutive samples, an audio intensity value of each sample, and a frequency value of each sample, where the first audio signal includes a plurality of audio frame signals.

The processor 1501 is further configured to determine a first smooth audio intensity value of a target sample according to an audio intensity value of a sample, the sample is in a previous processing signal of a first processing signal where the target sample is located and has a frequency value same as the target sample, and an audio intensity value of the target sample.

The processor 1501 is further configured to determine an inhibition coefficient of the target sample according to a probability that an audio frame signal where the target sample is located is transient noise, the first smooth audio intensity value of the target sample, and the audio intensity value of the target sample.

The processor 1501 is further configured to perform suppression on an audio intensity value of each sample in an audio frame signal where the target sample is located to obtain a suppressed audio frame signal, according to inhibition coefficients of all samples in the audio frame signal where the target sample is located.

In one possible implementation, the transceiver 1500 is further configured to obtain a probability that the first audio frame signal is transient noise and a probability that the second audio frame signal is transient noise, where the second audio frame signal is a previous audio frame signal of the first audio frame signal.

The processor 1501 is further configured to obtain a first smoothing probability according to the probability that the first audio frame signal is the transient noise and the probability that the second audio frame signal is transient noise and use the first smoothing probability as the probability that the first audio frame signal is transient noise.

In one possible implementation, the processor 1501 is further configured to divide the wavelet signal sequence to a plurality of signals to-be-smoothed, where each signal to-be-smoothed includes a fourth preset number of consecutive samples and an audio intensity value of each sample, each signal to-be-smoothed corresponds to a smoothing function, a time width of a definition domain of the smoothing function is not greater than a time width of the signal to-be-smoothed, a maximum value of a first smoothing function in the smoothing functions is located at a center of a definition domain of the first smoothing function; the processor 1501 is further configured to determine an average of audio intensity values of all samples in the first signal to-be-smoothed as a first average reference audio intensity value of all samples in the first smoothing signal, and perform convolution operation on the first average reference audio intensity value of all samples in each signal to-be-smoothed in the wavelet signal sequence and a corresponding smoothing function value to obtain a convolutional result, and use the convolutional result as an average reference audio intensity value of the first audio frame signal, where the smoothing function value is obtained according to the smoothing function and a time of a corresponding sample.

Optionally, the processor 1501 is further configured to: obtain a third reference audio intensity of the target sample by multiplying an audio intensity value of a previous sample of the target sample in the wavelet signal sequence with a smoothing coefficient, and obtain a fourth reference audio intensity value of the target sample by multiplying a remaining smoothing coefficient with an average of audio intensity values of all consecutive samples in the wavelet signal sequence which includes the target sample and are spliced before the target sample in the wavelet signal sequence, obtain the audio intensity value of the target sample by adding the third reference audio intensity value with the fourth reference audio intensity value.

In one possible implementation, the reference audio intensity value includes an average and a variance of audio intensity values of a fifth preset number of consecutive samples.

In one possible implementation, the processor 1501 is further configured to determine the probability that the first audio frame signal is transient noise as $$res(n)=\left[\frac{1}{2}\left(\cos\left(\text{result}(n)\times\frac{\pi}{\lambda}+\pi\right)+1\right)\right]^2$$

Where result(n) represents energy distribution information of a wavelet decomposition signal corresponding to the $n^{th}$ audio frame signal, n represents an frame index indicating the $n^{th}$ audio frame signal, λ represents a first preset threshold, if a value of result(n) is greater than the first preset threshold, the probability that the first audio frame signal is transient noise is 1.

Optionally, the processor 1501 is further configured to determine the energy distribution information of the first wavelet decomposition signal corresponding to the first audio frame signal as $$\text{result}(n)=\sum_{1}^{l}\left[\frac{1}{N}\sum_{i=(n-1)N+1}^{nN}\frac{\left(x_l(i)-m_l^1(i-1)\right)}{m_l^2(i-1)}\right],$$

where l represents the number of sub-wavelet decomposition signals included in the first wavelet decomposition signal, N represents the number of samples included in each sub-wavelet decomposition signal, n represents a frame index indicating the $n^{th}$ audio frame signal, $x_l(i)$ represents an audio intensity value of the $l^{th}$ sub-wavelet decomposition signal at the $i^{th}$ sample in a wavelet decomposition signal, $m_l^1(i-1)$ represents an average of audio intensity values till the $(i-1)^{th}$ sample in the $l^{th}$ sub-wavelet decomposition signal, $m_l^2(i-1)$ represents a variance of audio intensity values till the $(i-1)^{th}$ sample in the $l^{th}$ sub-wavelet decomposition signal.

In one possible implementation, the processor 1501 is further configured to: obtain a first average of audio intensity values of all samples in a first sub-wavelet decomposition signal and a second average of audio intensity values of all samples in a second sub-wavelet decomposition signal, and determine the probability that the first audio frame signal is transient noise according a ratio between the first average and the second average.

In one possible implementation, the processor 1501 is further configured to determine the second probability as $$p_s(n)=\frac{1}{1+e^{thr_g(thr_s-s_c(n))}},$$

where $thr_g$ represents a second preset threshold, $thr_s$ represents a third preset threshold, n represents a frame index indicating the $n^{th}$ audio frame signal, $S_c(n)$ represents an average reference audio intensity value of the $n^{th}$ audio frame signal.

Optionally, the processor 1501 is further configured to compensate high-frequency components of a first preset threshold in an original audio signal having the preset duration to obtain the first audio signal.

In one possible implementation, the processor 1501 is further configured to perform wavelet packet decomposition on each audio frame signal and use a signal obtained through wavelet packet decomposition as the wavelet decomposition signal.

It can be understood that, the apparatus for transient noise detection 14 can perform the implementation of steps of FIG. 1 to FIG. 12 with functional modules thereof, for details, reference can be made to the implementations of FIG. 1 to FIG. 12, which will not be repeated herein.

In this implementation, by counting the preset number of continuous samples in the wavelet packet decomposition signal corresponding to the audio frame signal and using the local microscopic characteristics of wavelet decomposition or wavelet packet decomposition, the accuracy of the probability that the audio frame signal is transient noise is improved, and the accuracy of transient noise detection is improved.

Implementations of the disclosure further provide a computer readable storage medium storing instructions which, when executed by a processor, are operable with the processor to carry out the method described above.

It should be noted that the above terms "first" and "second" are only used for descriptive purposes and cannot be understood as indicating or implying relative importance.

In this implementation, by counting the preset number of continuous samples in the sub-wavelet decomposition signals in the wavelet packet decomposition signal corresponding to the audio frame signal and using the local microscopic characteristics of wavelet decomposition or wavelet packet decomposition, the accuracy of the probability that the audio frame signal is transient noise is improved, and the accuracy of transient noise detection is improved. In addition, the probability that the signal frame is a voice signal is determined by forward tracking and backward tracking of distribution of audio intensity values of the voice signal with a preset duration, and the probability that the audio frame signal is transient noise is determined according to the probability that the audio frame signal is a voice signal and the probability that the audio frame signal is transient noise, as such, it is possible to avoid the false detection of the initial position of voice signal as transient noise, and further improve the accuracy of transient noise probability. Furthermore, the inhibition coefficient of transient noise is determined according to the probability that the signal frame is transient noise, as such, transient noise can be effectively expressed while maintaining signal characteristics of voice signals in the signal frame as much as possible.

It should be understood that in several implementations provided in the present application, the disclosed methods, devices and systems can be realized in other ways. The implementations described above are only schematic. For example, the division of the units is only a logical function division, and there can be another division mode in actual implementation. For example, multiple units or components can be combined or integrated into another system, or some features can be ignored or not executed. In addition, the coupling, direct coupling or communication connection between the components shown or discussed can be achieved through some interfaces, indirect coupling or communication connection of equipment or units, and can be electrical, mechanical or other forms.

The units described above as separate components can be or may not be physically separated, and the components illustrated as units can be or may not be physical units, that is, they can be located in one place or distributed on multiple network units. Some or all of the units can be selected according to the actual needs to achieve the purpose of the implementations.

In addition, in implementations of the disclosure, all functional units can be integrated into one processing unit, each unit can be used as a unit separately, or two or more units can be integrated into one unit. The above integrated units can be realized in the form of hardware or hardware plus software functional units.

Those skilled in the art can understand that all or part of the steps of realizing the above method implementations can be completed by program instruction related hardware. The above program can be stored in a computer-readable storage medium. When the program is executed, it executes the steps of the above method. The storage medium includes mobile storage device, read only memory (ROM), random access memory (RAM), magnetic disc or optical disc and other media that can store program codes.

Alternatively, if the above integrated unit of the disclosure is realized in the form of software function module and sold or used as an independent product, it can also be stored in a computer-readable storage medium. Based on this understanding, the technical schemes of the implementations of the disclosure, in essence or in the part that contributes to the prior art, can be embodied in the form of software products, the computer software product is stored in a storage medium and includes several instructions to enable a computer device (which can be a personal computer, server, network device, etc.) to perform all or part of the methods described in various implementations of the present disclosure. The storage medium includes mobile storage device, ROM, RAM, magnetic disc or optical disc and other media that can store program codes.

While the disclosure has been described in connection with certain embodiments, it is to be understood that the disclosure is not to be limited to the disclosed embodiments. Any person skilled in the art who can easily think of changes or replacements within the technical scope disclosed herein shall be covered by the protection scope of the disclosure. Therefore, the protection scope of the disclosure shall be subject to the protection scope of the claims.

What is claimed is:

1. A method for transient noise detection, comprising:

obtaining, by a processor, a first audio frame signal having a preset duration, the first audio frame signal comprising a plurality of samples and an audio intensity value of each sample;

performing, by a high-and-low pass filter, wavelet decomposition on the first audio frame signal to obtain a first wavelet decomposition signal corresponding to the first audio frame signal, the first wavelet decomposition signal comprising a plurality of sub-wavelet decomposition signals, and each sub-wavelet decomposition signal comprising a plurality of samples and an audio intensity value of each sample;

determining, by the processor, a first reference audio intensity value of a first sub-wavelet decomposition signal according to reference audio intensity values of all samples in the first sub-wavelet decomposition signal;

determining, by the processor, energy distribution information of the first wavelet decomposition signal according to first reference audio intensity values of all sub-wavelet decomposition signals in the first wavelet decomposition signal; and determining, by the processor, a probability that the first audio frame signal is transient noise according to the energy distribution information of the first wavelet decomposition signal.

2. The method of claim 1, wherein obtaining, by the processor, the first audio frame signal having the preset duration comprises:

obtaining a first audio signal, the first audio signal comprising at least one audio frame signal, the at least one audio frame signal comprising the first audio frame signal, for each audio frame signal, performing, by the high-and-low pass filter, wavelet decomposition to obtain a plurality of wavelet decomposition signals corresponding to each audio frame signal;

obtaining a wavelet signal sequence by splicing the wavelet decomposition signals corresponding to each audio frame signal according to a framing order of the at least one audio frame signal in the first audio signal, wherein:

the method further comprises:

obtaining, by the processor, a first minimum audio intensity value of a first preset number of consecutive samples in the wavelet signal sequence and a second minimum audio intensity value of a second present number of consecutive samples in the wavelet signal sequence, wherein the first preset number of consecutive samples comprises a target sample and is before the target sample in the wavelet signal sequence, the second preset number of consecutive samples comprises the target sample and is after the target sample in the wavelet signal sequence, and determining a second reference audio intensity value according to the first minimum audio intensity value and the second minimum audio intensity value;

determining, by the processor, an average reference audio intensity value of the first audio frame signal according to second reference audio intensity values of all samples in the first wavelet decomposition signal; and determining, by the processor, a first probability according to the average reference audio intensity value of the first audio frame signal; and determining, by the processor, the probability that the first audio frame signal is transient noise according to the energy distribution information of the first wavelet decomposition signal comprises:

obtaining a second probability according to the energy distribution information of the first wavelet decomposition signal; and determining the probability that the first audio frame signal is transient noise according to the first probability and the second probability.

3. The method of claim 1, wherein obtaining, by the processor, the first audio frame signal having the preset duration comprises:

obtaining a first audio signal, the first audio signal comprising at least one audio frame signal, the at least one audio frame signal comprising the first audio frame signal, wherein:

the method further comprises:

dividing, by the processor, the first audio signal to a plurality of processing signals, wherein each processing signal comprises a third preset number of consecutive samples, an audio intensity value of each sample, and a frequency value of each sample, wherein the first audio signal comprises a plurality of audio frame signals;

determining, by the processor, a first smooth audio intensity value of a target sample according to an audio intensity value of a sample, wherein the sample is in a previous processing signal of a first processing signal where the target sample is located and has a frequency value same as the target sample, and an audio intensity value of the target sample;

determining, by the processor, an inhibition coefficient of the target sample according to a probability that an audio frame signal where the target sample is located is transient noise, the first smooth audio intensity value of the target sample, and the audio intensity value of the target sample; and performing, by the processor, suppression on an audio intensity value of each sample in an audio frame signal where the target sample is located to obtain a suppressed audio frame signal, according to inhibition coefficients of all samples in the audio frame signal where the target sample is located.

4. The method of claim 1, further comprising:

obtaining, by the processor, a probability that the first audio frame signal is transient noise and a probability that the second audio frame signal is transient noise, wherein the second audio frame signal is a previous audio frame signal of the first audio frame signal; and obtaining, by the processor, a first smoothing probability according to the probability that the first audio frame signal is the transient noise and the probability that the second audio frame signal is transient noise and using the first smoothing probability as the probability that the first audio frame signal is transient noise.

5. The method of claim 2, wherein determining, by the processor, the average reference audio intensity value of the first audio frame signal according to the second reference audio intensity values of all samples in the wavelet decomposition signal comprises:

dividing the wavelet signal sequence to a plurality of signals to-be-smoothed, wherein each signal to-be-smoothed comprises a fourth preset number of consecutive samples and an audio intensity value of each sample, each signal to-be-smoothed corresponds to a smoothing function, a time width of a definition domain of the smoothing function is not greater than a time width of the signal to-be-smoothed, a maximum value of a first smoothing function in the smoothing functions is located at a center of a definition domain of the first smoothing function;

determining an average of audio intensity values of all samples in the first signal to-be-smoothed as a first average reference audio intensity value of all samples in the first smoothing signal; and performing convolution operation on the first average reference audio intensity value of all samples in each signal to-be-smoothed in the wavelet signal sequence and a corresponding smoothing function value to obtain a convolutional result, and using the convolutional result as an average reference audio intensity value of the first audio frame signal, wherein the smoothing function value is obtained according to the smoothing function and a time of a corresponding sample.

6. The method of claim 2, further comprising:

before obtaining the first minimum audio intensity value of the first preset number of consecutive samples in the wavelet signal sequence, wherein the first preset number of consecutive samples comprises the target sample and is before the target sample in the wavelet signal sequence, obtaining a third reference audio intensity of the target sample by multiplying an audio intensity value of a previous sample of the target sample in the wavelet signal sequence with a smoothing coefficient;

obtaining a fourth reference audio intensity value of the target sample by multiplying a remaining smoothing coefficient with an average of audio intensity values of all consecutive samples in the wavelet signal sequence which comprise the target sample and are spliced before the target sample in the wavelet signal sequence; and obtaining the audio intensity value of the target sample by adding the third reference audio intensity value with the fourth reference audio intensity value.

7. The method of claim 1, wherein the reference audio intensity value comprises an average and a variance of audio intensity values of a fifth preset number of consecutive samples.

8. The method of claim 1, wherein the probability that the first audio frame signal is transient noise is expressed as $$res(n)=\left[\frac{1}{2}\left(\cos\left(\text{result}(n)\times\frac{\pi}{\lambda}+\pi\right)+1\right)\right]^2;$$

wherein result(n) represents energy distribution information of a wavelet decomposition signal corresponding to the $n^{th}$ audio frame signal, n represents an frame index indicating the $n^{th}$ audio frame signal, λ represents a first preset threshold, if a value of result(n) is greater than the first preset threshold, the probability that the first audio frame signal is transient noise is 1.

9. The method of claim 8, wherein the energy distribution information of the first wavelet decomposition signal corresponding to the first audio frame signal is expressed as $$\text{result}(n)=\sum\nolimits_1^l\left[\frac{1}{N}\sum\nolimits_{i=(n-1)N+1}^{nN}\frac{(x_l(i)-m_l^1(i-1))}{m_l^2(i-1)}\right];$$

wherein l represents the number of sub-wavelet decomposition signals comprised in the first wavelet decomposition signal, N represents the number of samples comprised in each sub-wavelet decomposition signal, n represents a frame index indicating the $n^{th}$ audio frame signal, $x_l(i)$ represents an audio intensity value of the $l^{th}$ sub-wavelet decomposition signal at the $i^{th}$ sample in a wavelet decomposition signal, $m_l^1(i-1)$ represents an average of audio intensity values till the $(i-1)^{th}$ sample in the $l^{th}$ sub-wavelet decomposition signal, $m_l^2(i-1)$ represents a variance of audio intensity values till the $(i-1)^{th}$ sample in the $l^{th}$ sub-wavelet decomposition signal.

10. The method of claim 1, wherein determining, by the processor, the probability that the first audio frame signal is transient noise according to the energy distribution information of the first wavelet decomposition signal comprises:

obtaining a first average of audio intensity values of all samples in a first sub-wavelet decomposition signal and a second average of audio intensity values of all samples in a second sub-wavelet decomposition signal; and determining the probability that the first audio frame signal is transient noise according a ratio between the first average and the second average.

11. The method of claim 2, wherein the second probability is expressed as $$p_s(n)=\frac{1}{1+e^{thr_g(thr_s-s_c(n))}};$$

wherein $thr_g$ represents a second preset threshold, $thr_s$ represents a third preset threshold, n represents a frame index indicating the $n^{th}$ audio frame signal, $S_c(n)$ represents an average reference audio intensity value of the $n^{th}$ audio frame signal.

12. The method of claim 2, further comprising:

before obtaining the first audio signal, compensating, by the processor, high-frequency components of a first preset threshold in an original audio signal having the preset duration to obtain the first audio signal.

13. The method of claim 1, wherein performing, by the high-and-low pass filter, wavelet decomposition on the first audio frame signal comprises:

performing, by the high-and-low pass filter, wavelet packet decomposition on the audio frame signal and using a signal obtained through wavelet packet decomposition as the wavelet decomposition signal.

14. An apparatus for transient noise detection, comprising:

an obtaining module configured to obtain a first audio frame signal having a preset duration, the first audio frame signal comprising a plurality of samples and an audio intensity value of each sample;

a decomposition module configured to perform wavelet decomposition on a first audio frame signal to obtain a first wavelet decomposition signal corresponding to the first audio frame signal, the first wavelet decomposition signal comprising a plurality of sub-wavelet decomposition signals, and each sub-wavelet decomposition signal comprising a plurality of samples and an audio intensity value of each sample;

a determining module configured to determine a first reference audio intensity value of a first sub-wavelet decomposition signal according to reference audio intensity values of all samples in the first sub-wavelet decomposition signal;

the determining module is further configured to determine energy distribution information of the first wavelet decomposition signal according to first reference audio intensity values of all sub-wavelet decomposition signals in the first wavelet decomposition signal; and the determining module is further configured to determine a probability that the first audio frame signal is transient noise according to the energy distribution information of the first wavelet decomposition signal.

15. The apparatus of claim 14, wherein the obtaining module configured to obtain the first audio frame signals having the preset duration is configured to:

obtain a first audio signal, the first audio signal comprising at least one audio frame signal, for each audio frame signal, performing wavelet decomposition to obtain a plurality of wavelet decomposition signals corresponding to each audio frame signal; and obtain a wavelet signal sequence by splicing the wavelet decomposition signals corresponding to each audio frame signal according to a framing order of the at least one audio frame signal in the first audio signal.

16. The apparatus of claim 15, wherein the obtaining module is further configured to:

obtain a first minimum audio intensity value of a first preset number of consecutive samples in the wavelet signal sequence and a second minimum audio intensity value of a second present number of consecutive samples in the wavelet signal sequence, wherein the first preset number of consecutive samples comprises a target sample and is before the target sample in the wavelet signal sequence, the second preset number of consecutive samples comprises the target sample and is after the target sample in the wavelet signal sequence, and determining a second reference audio intensity value according to the first minimum audio intensity value and the second minimum audio intensity value.

17. The apparatus of claim 16, wherein the determining module is further configured to:

determine an average reference audio intensity value of the first audio frame signal according to second reference audio intensity values of all samples in the first wavelet decomposition signal; and determine a first probability according to the average reference audio intensity value of the first audio frame signal.

18. The apparatus of claim 17, wherein the determining module configured to determine the probability that the first audio frame signal is transient noise according to the energy distribution information of the first wavelet decomposition signal is configured to:

obtain a second probability according to the energy distribution information of the first wavelet decomposition signal; and determine the probability that the first audio frame signal is transient noise according to the first probability and the second probability.

19. A device for transient noise detection, comprising a transceiver, a processor, and a memory, wherein the processor is configured to execute computer programs stored in the memory to implement the following operations:

obtaining a first audio frame signal having a preset duration, the first audio frame signal comprising a plurality of samples and an audio intensity value of each sample;

performing wavelet decomposition on the first audio frame signal to obtain a first wavelet decomposition signal corresponding to the first audio frame signal, the first wavelet decomposition signal comprising a plurality of sub-wavelet decomposition signals, and each sub-wavelet decomposition signal comprising a plurality of samples and an audio intensity value of each sample;

determining a first reference audio intensity value of a first sub-wavelet decomposition signal according to reference audio intensity values of all samples in the first sub-wavelet decomposition signal;

determining energy distribution information of the first wavelet decomposition signal according to first reference audio intensity values of all sub-wavelet decomposition signals in the first wavelet decomposition signal; and determining a probability that the first audio frame signal is transient noise according to the energy distribution information of the first wavelet decomposition signal.

20. A non-transitory computer readable storage medium storing program codes which, when executed by a computer, are operable with the computer to perform the method of claim 1.

* * * * *